(12) United States Patent
Bar-Or et al.

(10) Patent No.: US 11,220,281 B2
(45) Date of Patent: Jan. 11, 2022

(54) CONNECTOR FOR RELEASABLY COUPLING TWO WHEELED-CARTS

(71) Applicant: FREEWILL LTD, Pardes Hana-Karkur (IL)

(72) Inventors: Jonathan Bar-Or, Pardes Hanna (IL); Dana Yichye Shwachman, Tel Aviv (IL)

(73) Assignee: FREEWILL LTD, Pardes Hana-Karkur (IL)

( * ) Notice: Subject to any disclaimer, the term of this patent is extended or adjusted under 35 U.S.C. 154(b) by 0 days.

(21) Appl. No.: 15/733,617

(22) PCT Filed: Mar. 21, 2019

(86) PCT No.: PCT/IL2019/050319
§ 371 (c)(1),
(2) Date: Sep. 16, 2020

(87) PCT Pub. No.: WO2019/180721
PCT Pub. Date: Sep. 26, 2019

(65) Prior Publication Data
US 2021/0024113 A1  Jan. 28, 2021

(30) Foreign Application Priority Data
Mar. 21, 2018  (IL) .......................................... 258264

(51) Int. Cl.
*B62B 5/00* (2006.01)
*A61G 5/10* (2006.01)
(52) U.S. Cl.
CPC ............ *B62B 5/0016* (2013.01); *B62B 5/002* (2013.01); *A61G 5/10* (2013.01); *A61G 2203/80* (2013.01); *B62B 2207/02* (2013.01)

(58) Field of Classification Search
CPC ... B62B 5/087; B62B 5/0079; B62B 2207/00; B62B 2207/02; B62B 9/28; B62B 5/08;
(Continued)

(56) References Cited

U.S. PATENT DOCUMENTS 4,471,972 A * 9/1984 Young ..................... A61G 5/023
280/244
4,484,755 A * 11/1984 Houston .................. A61G 5/10
280/304.1
(Continued)

FOREIGN PATENT DOCUMENTS

| EP | 0848939 | 6/1998 |
| EP | 1514789 | 3/2005 |

(Continued)

OTHER PUBLICATIONS

International Search Report and Written Opinion dated Jun. 30, 2019 in International Patent Application No. PCT/IL2019/050319.
(Continued)

*Primary Examiner* — Emma K Frick
(74) *Attorney, Agent, or Firm* — Norton Rose Fulbright US LLP

(57) ABSTRACT

A connector for releasably attaching two wheeled-carts, wherein one can be a stroller and the other can be a wheelchair. The connector comprises an elongated body that forms an arm that is configured to be foldable, detachable or combination of both foldable and detachable, a first clamp connected to one end of the arm via a joint member, a locking arrangement for enabling to lock the arm in an unfolded position, and a second clamp connected to the other end of the arm.

19 Claims, 27 Drawing Sheets

(58) Field of Classification Search
CPC ......... B62B 5/082; B62B 5/085; B62B 5/002; B62B 5/0016; B62K 27/12; B62K 27/003; A61G 2203/80; A61G 2203/78
See application file for complete search history.

(56) References Cited

U.S. PATENT DOCUMENTS

| | | | | | |
|---|---|---|---|---|---|
| 5,207,286 | A * | 5/1993 | McKelvey | ............. | A61G 5/047 180/13 |
| 5,522,121 | A * | 6/1996 | Fraynd | ...................... | B62B 9/00 24/335 |
| 5,775,714 | A * | 7/1998 | Meadows | .............. | B60D 1/143 280/458 |
| 5,918,892 | A * | 7/1999 | Aaron | ................... | F16B 7/0433 280/47.38 |
| 6,286,847 | B1 * | 9/2001 | Perrin | ................... | B62K 13/02 280/204 |
| 6,315,306 | B1 * | 11/2001 | Fernie | ...................... | A61G 5/00 280/33.991 |
| 6,325,168 | B1 * | 12/2001 | Hillel | .................... | A61G 5/104 180/14.1 |
| 6,702,313 | B2 * | 3/2004 | Forshee | ................... | A61G 5/10 280/304.1 |
| 7,017,938 | B2 * | 3/2006 | Kinzel | ...................... | B62B 3/02 280/62 |
| 7,093,841 | B2 * | 8/2006 | Conrad | .............. | B60B 33/0039 280/33.991 |
| 7,591,509 | B2 * | 9/2009 | Almy | ...................... | A47C 3/34 297/195.11 |
| 7,597,332 | B2 * | 10/2009 | Thompson | ................ | B62B 7/00 280/33.991 |
| 7,766,358 | B1 * | 8/2010 | Phillips | .................. | B62K 27/12 280/204 |
| 7,871,088 | B2 * | 1/2011 | Silva | ........................ | A61G 5/10 280/33.998 |
| 8,308,406 | B2 * | 11/2012 | Parks | ...................... | A61G 5/10 410/7 |
| 8,622,357 | B2 * | 1/2014 | Youngblood | .......... | A45C 13/28 248/276.1 |
| 8,650,735 | B2 * | 2/2014 | Johnson | ............... | A61G 3/0808 29/428 |
| 8,870,209 | B2 * | 10/2014 | Conrad | .................. | B60D 1/167 280/304.1 |
| 9,150,064 | B1 * | 10/2015 | Landreth | .................. | B60D 1/18 |
| 9,302,558 | B2 * | 4/2016 | Lee | ........................ | B60D 1/249 |
| 9,308,928 | B2 * | 4/2016 | Thorpe | .................... | B62B 5/067 |
| 9,321,472 | B2 * | 4/2016 | Yadan | ....................... | B62B 3/02 |
| 9,321,475 | B2 * | 4/2016 | Weber | ..................... | B62B 5/087 |
| 9,351,901 | B1 * | 5/2016 | Petsch | ...................... | A61H 3/00 |
| 9,469,323 | B2 * | 10/2016 | Lin | .......................... | B62B 3/001 |
| 9,877,882 | B2 * | 1/2018 | Stewart | .................... | A61G 5/10 |
| 10,023,215 | B2 * | 7/2018 | Salha | ........................ | B62K 7/04 |
| 10,052,254 | B2 * | 8/2018 | Chen | ......................... | A61G 5/10 |
| 10,183,719 | B2 * | 1/2019 | McManus | ............ | B62K 27/003 |
| 10,315,678 | B2 * | 6/2019 | Jones | .................... | B62B 3/1412 |
| 10,675,930 | B1 * | 6/2020 | Ramstad | ................ | B60D 1/143 |
| 10,773,768 | B2 * | 9/2020 | Berendzen | ............. | B62B 7/142 |
| 10,786,407 | B2 * | 9/2020 | Ellis | ........................ | B60D 1/52 |
| 10,913,479 | B1 * | 2/2021 | Cardentey | ............... | B62B 7/042 |
| 2008/0122200 | A1 * | 5/2008 | Lake | ....................... | B62B 7/008 280/514 |
| 2013/0038036 | A1 * | 2/2013 | Lester | .................. | A61G 5/1094 280/304.1 |
| 2020/0246206 | A1 * | 8/2020 | Carr | ......................... | A61G 5/10 |

FOREIGN PATENT DOCUMENTS

| | | |
|---|---|---|
| FR | 2573379 | 6/1986 |
| GB | 2268134 | 1/1994 |

OTHER PUBLICATIONS

International Preliminary Report on Patentability dated Mar. 24, 2020 in International Patent Application No. PCT/IL2019/050319.
Extended European Search Report for European Application No. 19772544.3 dated Nov. 9, 2021, 8 pages.

* cited by examiner

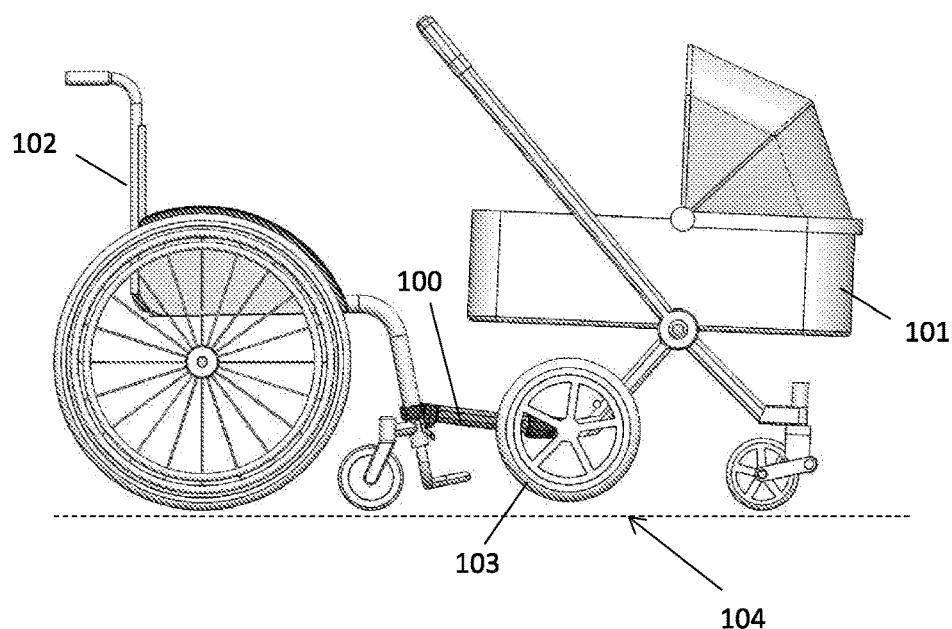
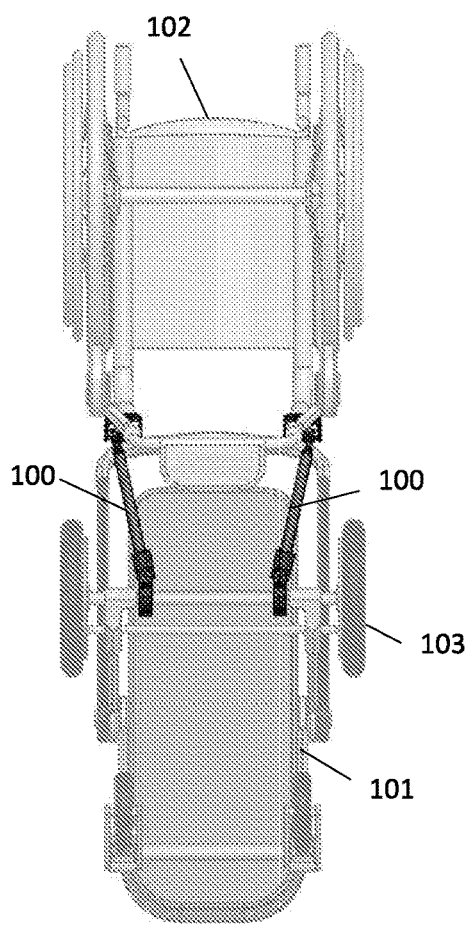
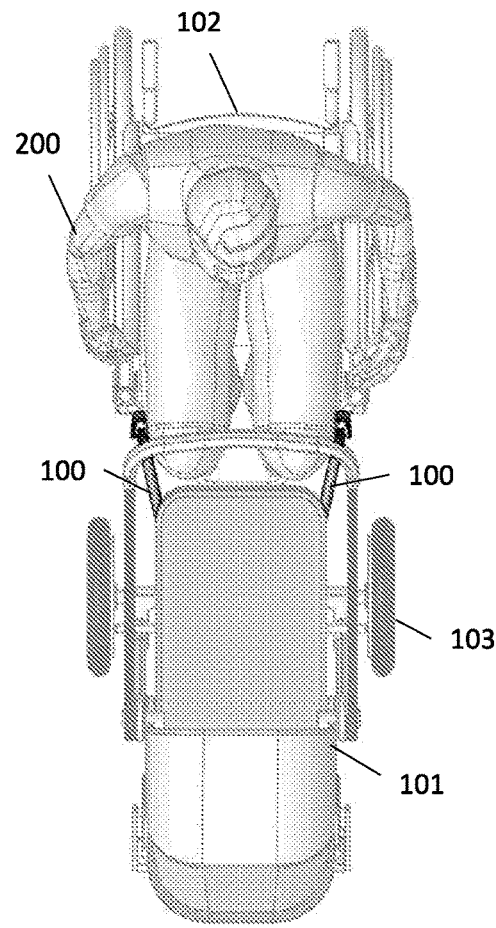
Fig. 3A
Fig. 3B
Fig. 3C

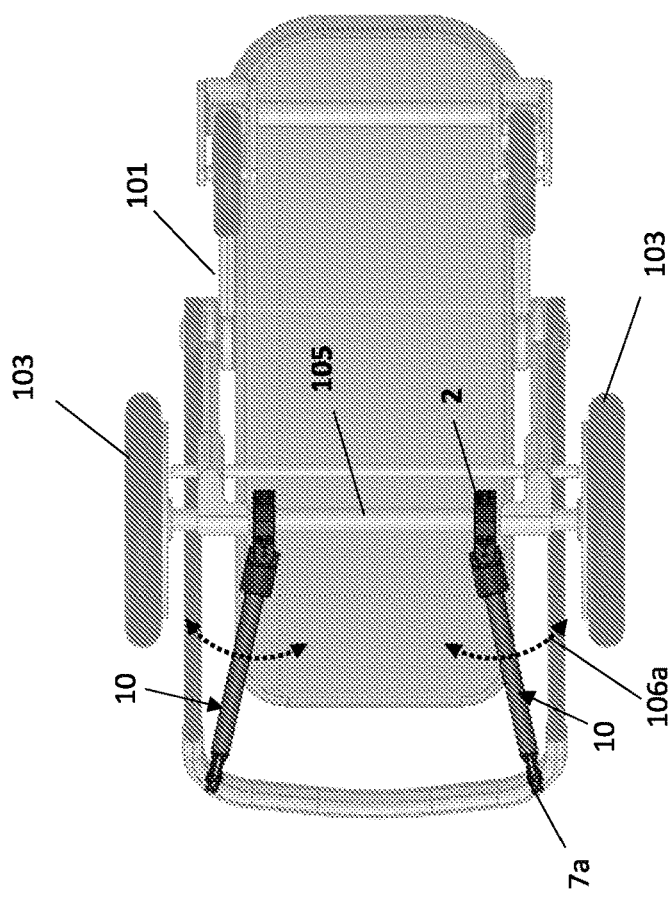
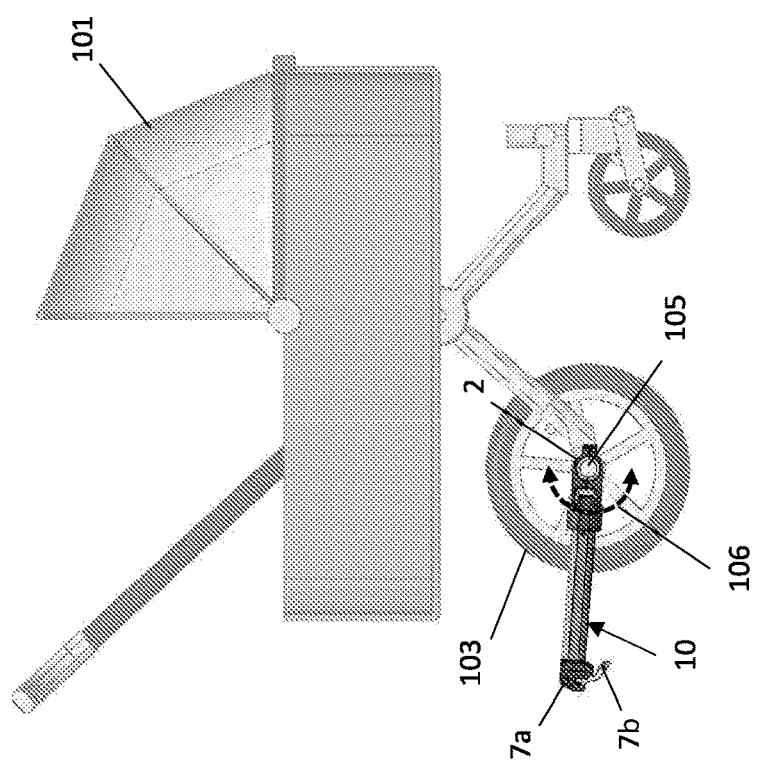
Fig. 4A
Fig. 4B

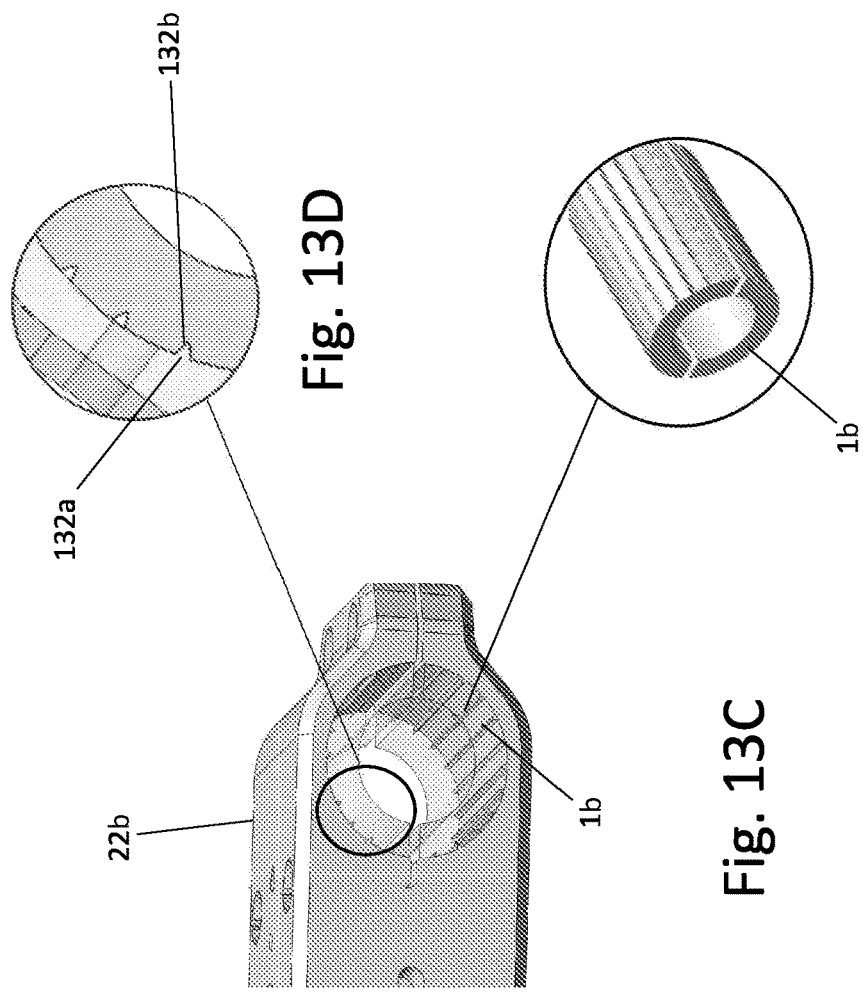
Fig. 13D
Fig. 13E
Fig. 13C
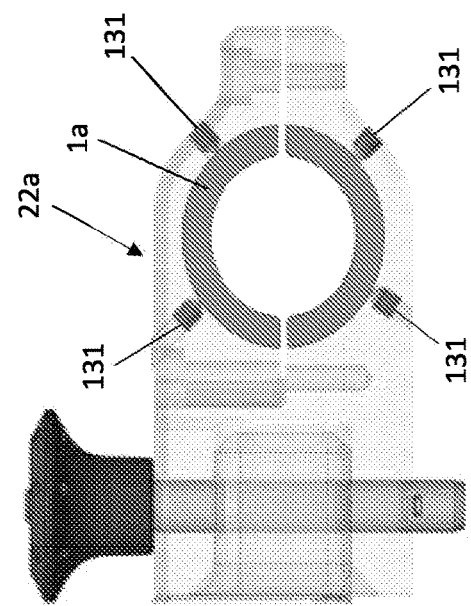
Fig. 13B

CONNECTOR FOR RELEASABLY COUPLING TWO WHEELED-CARTS

CROSS REFERENCE TO RELATED APPLICATIONS

This application is a national phase under 35 U.S.C. § 371 of International Application No. PCT/IL2019/050319, filed Mar. 21, 2019, which claims the benefit of priority to Israeli Patent Application No. 258264, filed Mar. 21, 2018, the entire contents of each of which are hereby incorporated by reference in their entirety.

FIELD OF THE INVENTION

The present invention relates to the field of wheeled-carts coupling. More particularly, the invention relates to a device for enabling to releasably connecting one wheel-cart to another, such as a wheelchair to a stroller.

BACKGROUND OF THE INVENTION

The daily routine of people with disabilities is highly affected by the capability to perform simple tasks such as maneuvering a shopping-cart in a supermarket, or steering a stroller. For example, people confined to a wheelchair may find it quite challenging to steer a stroller. In the prior-art several attempts were made in order to ease the challenge. For example, the Cursum stroller concept aims to make life a little easier by adapting to use in tandem with a wheelchair. However, such a solution cannot be used by many popular types of existing strollers, or it requires performing modifications in the structure of the stroller.

Other solutions refer to the field of connecting wheelchairs to shopping carts, such as U.S. Pat. Nos. 8,870,209 and 6,702,313. However, such solutions lack the ability to enable a better steering of a stroller. Moreover, applying such solutions to a stroller will prevent an appropriate folding of the stroller as long as the devices of such solutions are attached to the stroller.

It is an object of the present invention to provide a device for enabling to releasably connecting a wheelchair to a stroller in a way that will overcome the drawbacks of the prior art.

It is another object of the present invention to provide a device that enables a user to operate it in one hand.

It is yet another object of the present invention to provide a device that is capable of relatively fast releasing a wheelchair form a stroller, in order to enable immediate response and access to a baby located in the stroller.

Other advantages and objects of the invention will become apparent as the description proceeds.

SUMMARY OF THE INVENTION

The present invention relates to a connector for releasably attaching a first wheeled-cart to a second wheeled-cart, comprising:
a) an elongated body that forms an arm;
b) a first clamp connected to one end of the arm via a joint member, wherein said joint member enables relative movement of said arm in at least one degree of freedom;
c) a locking arrangement for locking said arm in a folded or in an unfolded position; and
d) a second clamp connected to the other end of said arm, wherein the first clamp is adapted to be coupled to the first wheeled-cart and the second clamp is adapted to be releasably attached to the second wheeled-cart when said arm is locked in an unfolded position, wherein said second clamp is adapted to be quickly released from said second wheeled-cart.

According to an embodiment of the present invention, the second clamp is releasably attached to the second wheeled-cart via an adapter that is adapted to be mounted on the second wheeled-cart.

According to an embodiment of the present invention, the adapter comprises attachment means for mounting the adapter on a desired location on the second wheeled-cart and a body section or an element that is adapted to enable the second clamp to be releasably attached to said adapter.

According to an embodiment of the present invention, the length of the elongated body is adjustable.

According to an embodiment of the present invention, the connector further comprises telescopic arrangement for adjusting the length of the elongated body.

According to an embodiment of the present invention, the first wheeled-cart is a stroller and the second wheeled-cart is a wheelchair.

According to an embodiment of the present invention, attaching the stroller to the wheelchair results in lifted rear wheels of the first wheeled-cart.

According to an embodiment of the present invention, the connector is provided with a quick-release locking pin mechanism for enabling a single action disengagement of the first wheeled cart from the arm which remain connected to the second wheeled-cart.

According to an embodiment of the present invention, the locking pin is provided with a securement measure, utilized to avoid undesired loss of said pin when it is not pulled out.

According to an embodiment of the present invention, the second clamp comprises a spring loaded hinge mechanism for enabling an automatic secured engagement with the corresponding adapter of the second wheeled-cart.

According to an embodiment of the present invention, the second clamp comprises a lifting handle, which allows the one-hand lifting of said connector together with the first wheeled-cart and to be engaged or disengaged with the corresponding adapter of the second wheeled-cart—in a single action.

According to an embodiment of the present invention, the locking arrangement for locking said arm in a folded or in an unfolded position is a slideable sleeve arrangement.

According to an embodiment of the present invention, the arm folding is adjustable in angular steps, by a folding mechanical arrangement, such as cog wheels mechanism, latching pins and jagged base plate arrangements.

According to an embodiment of the present invention, the arm folding angle is continuously adjustable, by a folding mechanical arrangement, such as joining leadscrew (e.g., jackscrew) and clutch plates mechanisms.

According to an embodiment of the present invention, the first clamp is designed to connect to a substantially horizontal (i.e., relative to ground) structural member of the first wheeled-cart and orthogonal to the intended travel direction of wheeled cart, wherein said structural member can be of various cross section shapes and diameters.

According to an embodiment of the present invention, the structural member is the rear axle of the first wheeled-cart.

According to an embodiment of the present invention, the connector is provided with at least one anti-swivel measure for preventing the swivel of the rear axle of the first wheeled-cart inside the first clamp.

According to an embodiment of the present invention, the connector is provided with an auxiliary bar which is designed to be coupled to the first wheel-cart, thus providing an alternative connection point of the first clamp to the first wheeled-cart (e.g., when the first wheeled-cart is not provided with a rear axle).

BRIEF DESCRIPTION OF THE DRAWINGS

In the drawings:

FIG. 3A schematically illustrates a side view of FIG. 2;

FIG. 3B schematically illustrates a bottom view of FIG. 2;

FIG. 3C schematically illustrates a top view of FIG. 2 with a wheelchair's occupant;

FIG. 4A schematically illustrates a side view of the foldable arm of the connector attached to a stroller, according to an embodiment of the invention;

FIG. 4B schematically illustrates a bottom view of FIG. 4A;

FIG. 13B schematically illustrates a swivel-prevention fixation screws arrangement for preventing the swivel of stroller's rear wheels axle in relation with clamp 22, according to an embodiment of the invention;

FIGS. 13C-13F schematically illustrates additional swivel-prevention measures for preventing the swivel of stroller's rear wheels axle in relation with clamp 22, according to embodiments of the invention;

DETAILED DESCRIPTION OF THE INVENTION

The present invention relates to a connector for releasably attaching two wheeled-carts. According to an embodiment of the invention the connector comprises an elongated body that forms an arm that is configured to be foldable, detachable or combination of both foldable and detachable, a first clamp connected to one end of the arm via a joint member, a locking arrangement for enabling to lock the arm in an unfolded position, and a second clamp connected to the other end of the arm. The joint member enables relative movement of the arm in at least one degree of freedom. The first clamp is adapted to be coupled to a first wheeled-cart and the second clamp is adapted to be releasably attached to a second wheeled-cart when the arm is locked in an unfolded position. According to an embodiment of the invention, the second clamp can be directly attached to the second wheeled-cart or indirectly via an adapter that is adapted to be mounted on the second wheeled-cart. The adapter comprises attachment means (e.g., a clamp) for mounting the adapter on the desired location on the second wheeled-cart and a body section or an element that is adapted to enable the second clamp to be releasably attached to the adapter. For example, the first wheeled-cart can be a stroller and the second wheeled-cart can be a wheelchair.

Reference will now be made to several embodiments of the present invention, examples of which are illustrated in the accompanying figures. Wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
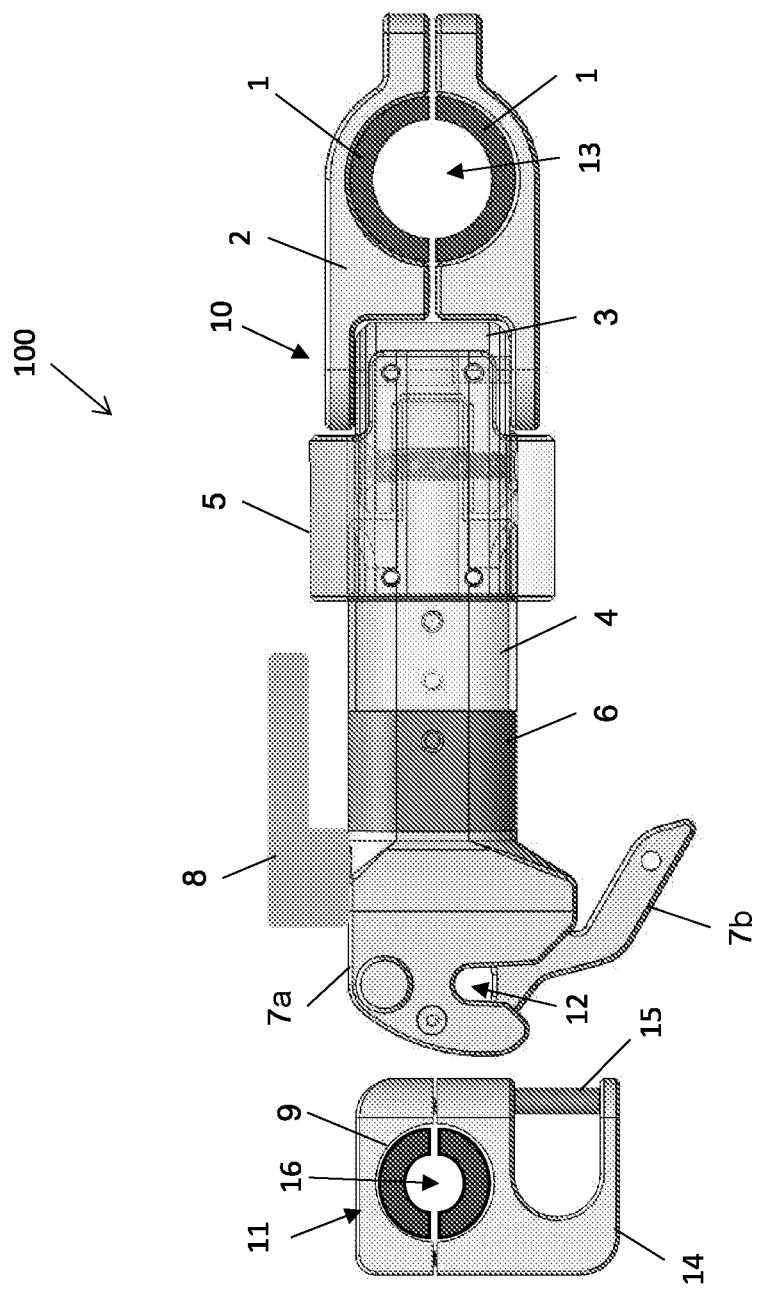
FIG. 1 schematically illustrates a connector for releasably attaching a wheelchair to a stroller, according to an embodiment of the present invention. In this embodiment, the connector comprises a foldable arm and an adapter.

FIG. 1 shows a connector that can be used in conjunction with the invention. The connector illustrated in this figure is particularly convenient because it can be applied as an ad-on device to existing wheeled-carts such as strollers and wheelchairs without the need to carry out any alterations in their structure. The connector generally indicated by numeral 100 in the figure comprises a foldable arm 10 adapted to be coupled to a stroller and an adapter 11 adapted to be coupled to a wheelchair (For the sake of clarity, FIG. 1 shows a side view of arm 10 and a top view of adapter 11, yet the actual relative position is best shown in FIG. 10). In this embodiment of the invention, foldable arm 10 and adapter 11 are adapted to be releasably connected in a manner that partially lifts the stroller's rear wheels (i.e., the wheels of the stroller that are adjacent to the coupled wheelchair) in order to facilitate the steering of the stroller, to be discussed in greater details below.

Figure 2:
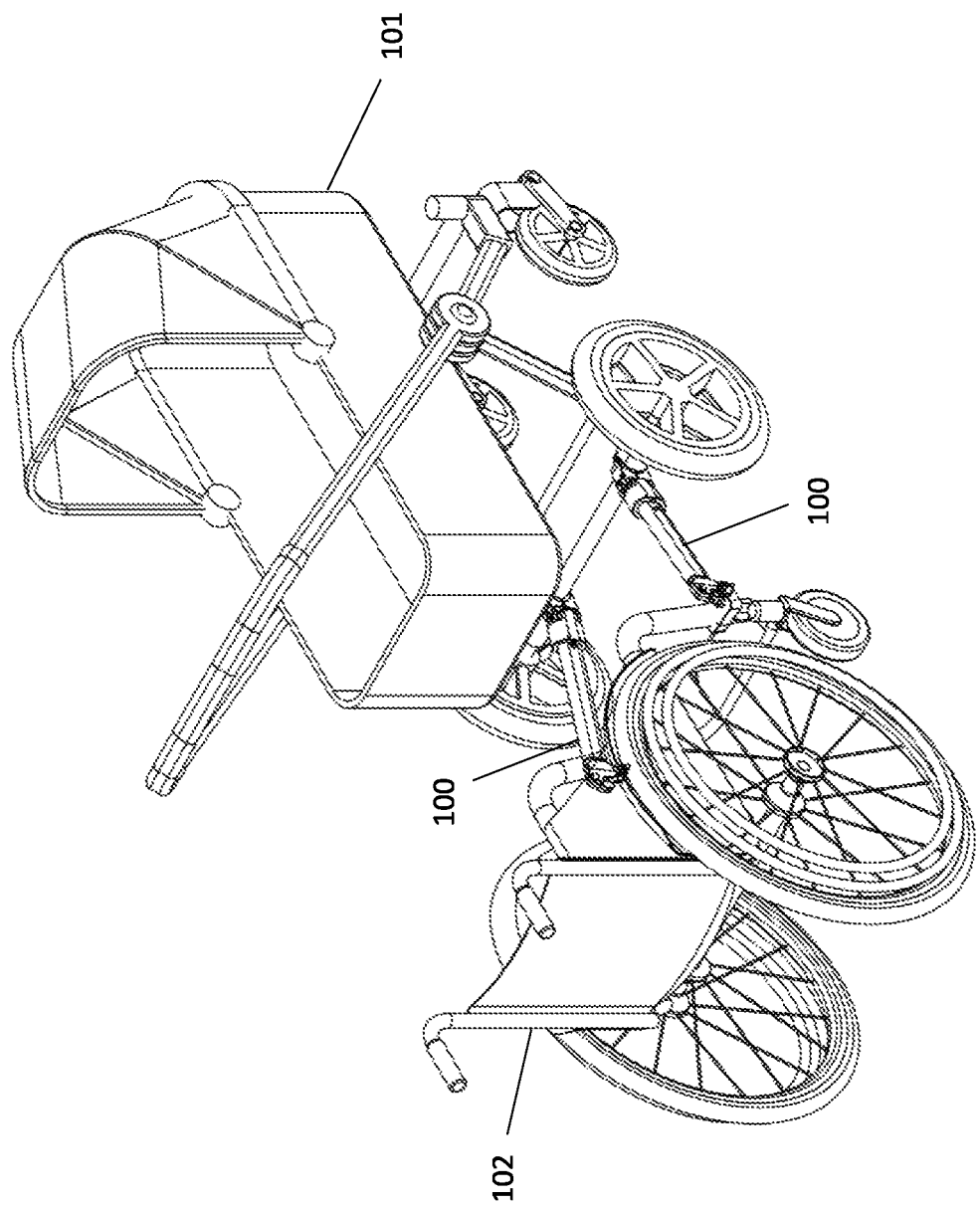
FIG. 2 schematically illustrates a perspective view of a wheelchair connected to a stroller using two units of the connector of FIG. 1, according to an embodiment of the invention.
Figure 5B:
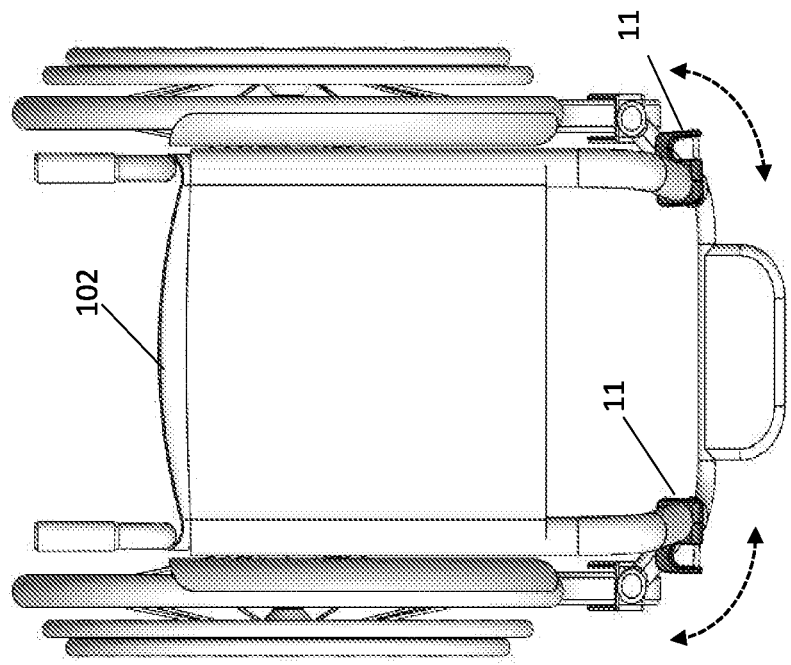
FIG. 5B schematically illustrates a top view of FIG. 5A.
Figure 5A:
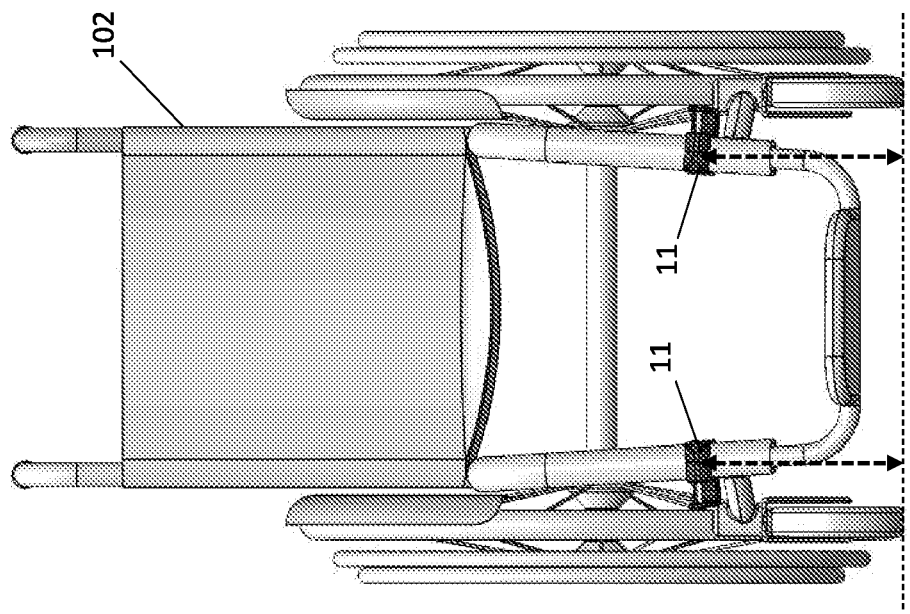
FIG. 5A schematically illustrates a front view of the adapter attached to a wheelchair, according to an embodiment of the invention.

FIG. 2 schematically illustrates a perspective view of a wheelchair 102 connected to a stroller 101 by using two units of connector 100, according to an embodiment of the invention. FIG. 3A schematically illustrates a side view of FIG. 2, FIG. 3B schematically illustrates a bottom view of FIG. 2, and FIG. 3C schematically illustrates a top view of FIG. 2 with a wheelchair's occupant 200.

According to an embodiment of the present invention, arm 10 of FIG. 1 may comprise the following parts: a first clamp 2 adapted to be mounted on a stroller's axle (either directly or via a corresponding inner-clamp and swivel stopper adapter), a turning-folding part 4 that is pivotally connected to an angle locking part 3 that forms together a joint member, a slideable sleeve 5 that forms a locking arrangement together with locking part 3 (for locking foldable arm 10 in an unfolded position), an elongated body 6, and a second clamp 7a and its trigger-latch handle 7b that enables locking/unlocking of second clamp 7a (thereby enabling to releasably attach one wheeled-cart to another). Arm 10 may further comprise an optional handle 8 (Further illustrated in FIG. 12). Arm 10 may further comprise an inner-clamp and an adapter 1 that is adapted to fit a corresponding structural member of the first wheeled cart which is substantially horizontal (i.e., with respect to the ground) and orthogonal to the intended travel direction of the coupled wheeled-carts). The design of clamp 2 with an internal adapter 1 enables the coupling of arm 10 to structural members of various cross section shapes and sizes. Furthermore, this arrangement prevent clamp 2 from turning around or sliding along the structural member of the first wheeled cart.

Adapter 11 comprises the following parts: a wheelchair clamp 14 and an elongated portion 15 on which second clamp 7a can be engaged to (i.e., via an opening that is formed by a section of clamp 7a and a section of trigger-latch handle 7b as indicated by numeral 12 in FIG. 1).

Figure 7:
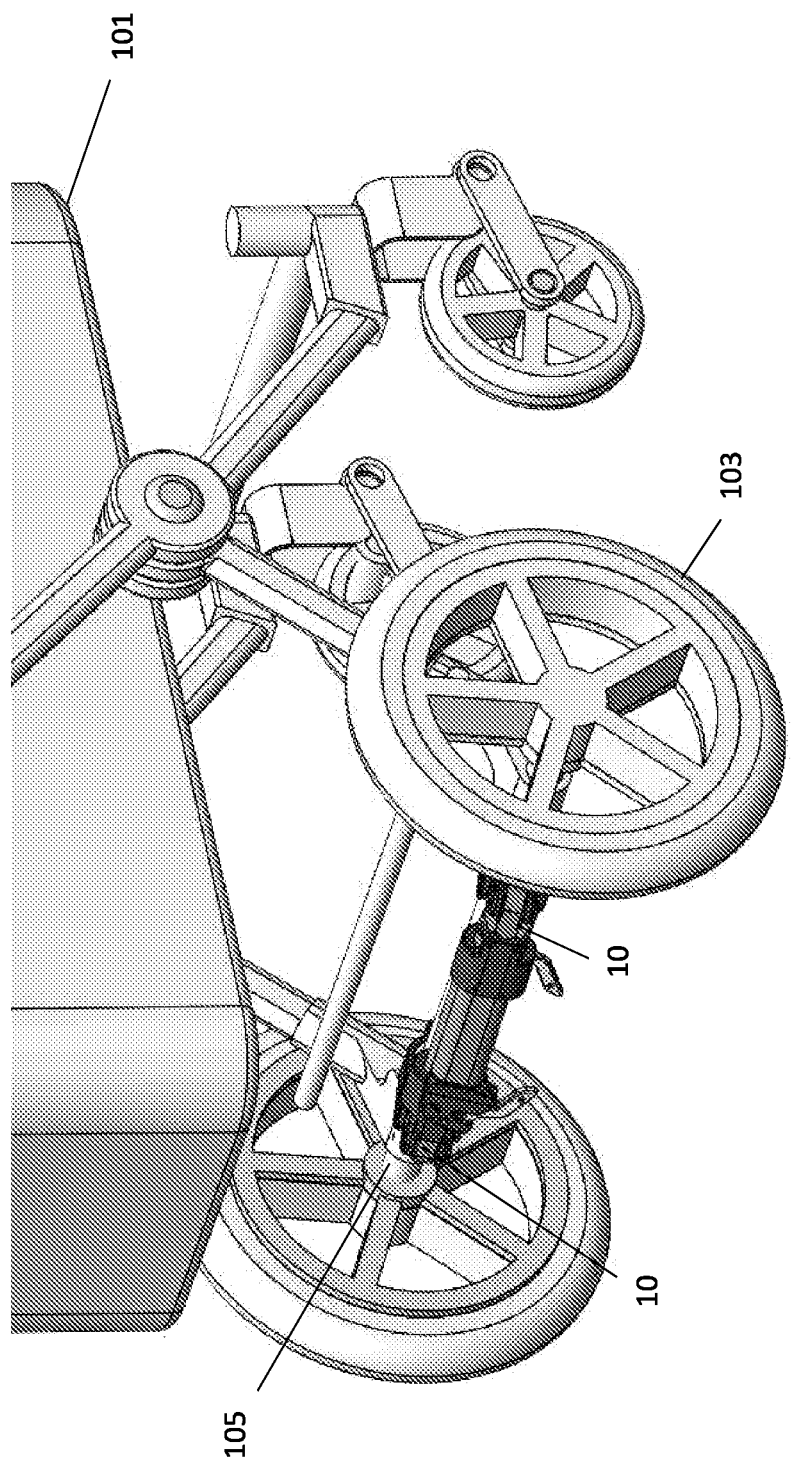
FIG. 7 schematically illustrates a detailed view of the foldable arm in a folded position, according to an embodiment of the invention.
Figure 8A:
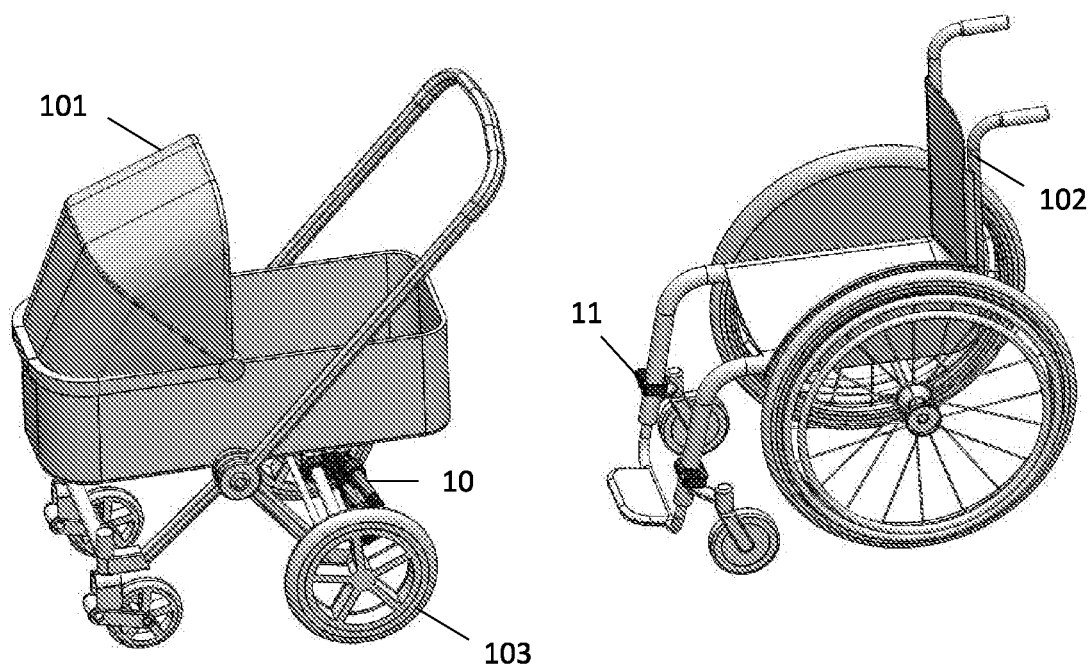
FIG. 8A schematically illustrates a perspective view of the foldable arm attached to a stroller in a folded position, according to an embodiment of the invention.
Figure 8B:
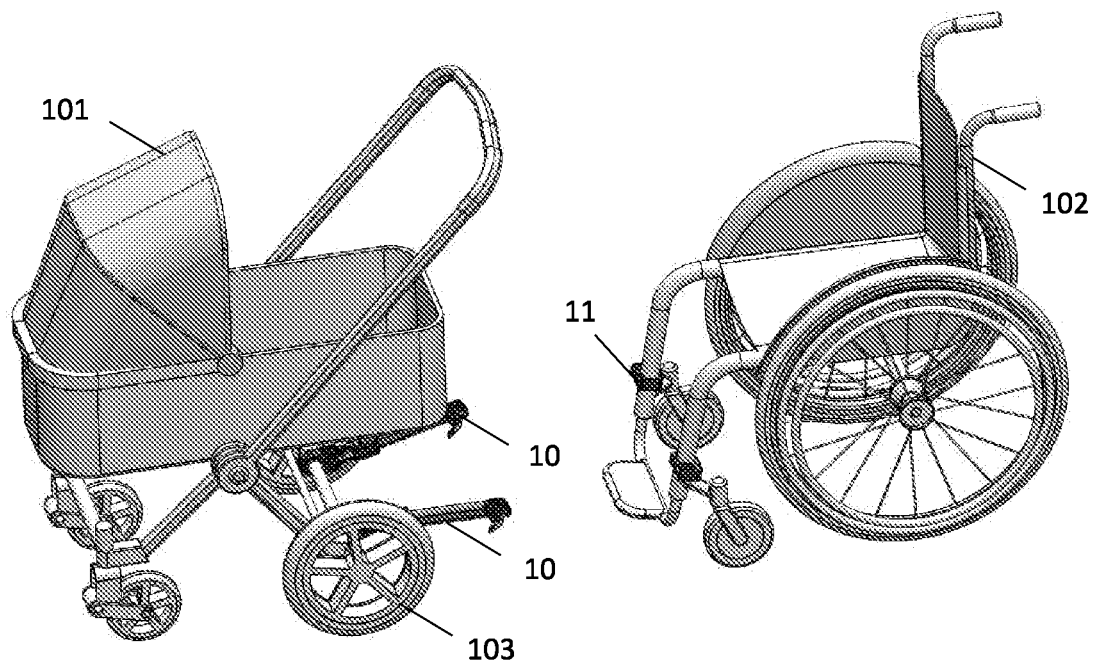
FIG. 8B schematically illustrates a perspective view of the foldable arm attached to a stroller in an unfolded position prior to the engagement with the adapter that is attached to a wheelchair, according to an embodiment of the invention.
Figure 9A:
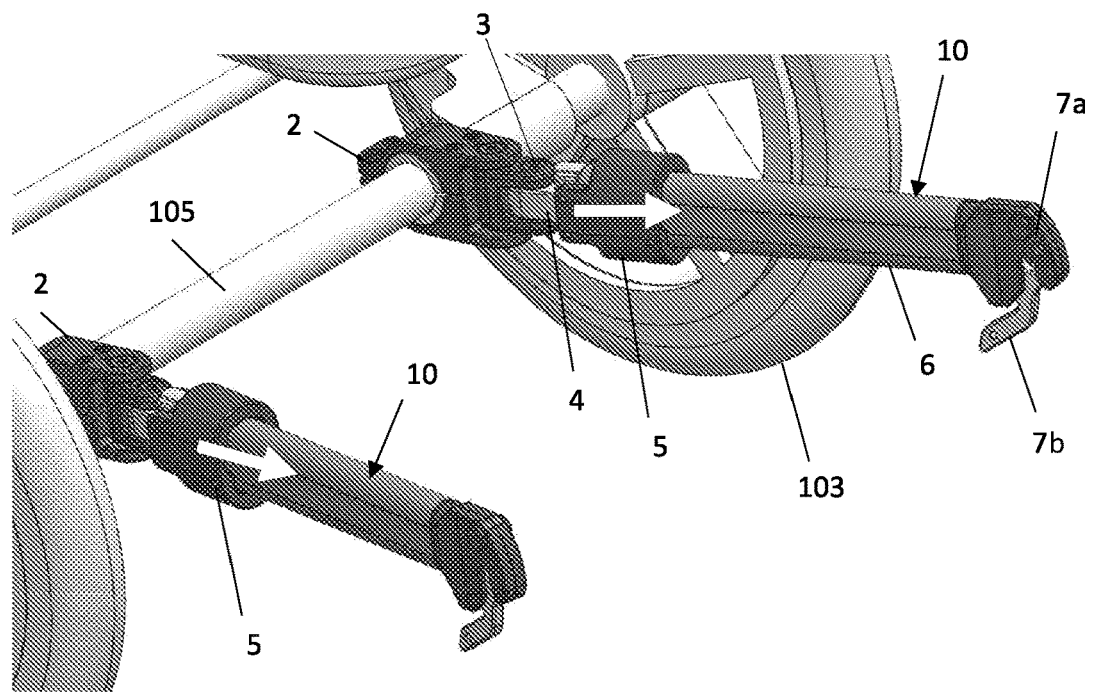
FIGS. 9A and 9B schematically illustrate the locking of the foldable arm in an unfolded position, according to an embodiment of the invention.
Figure 9B:
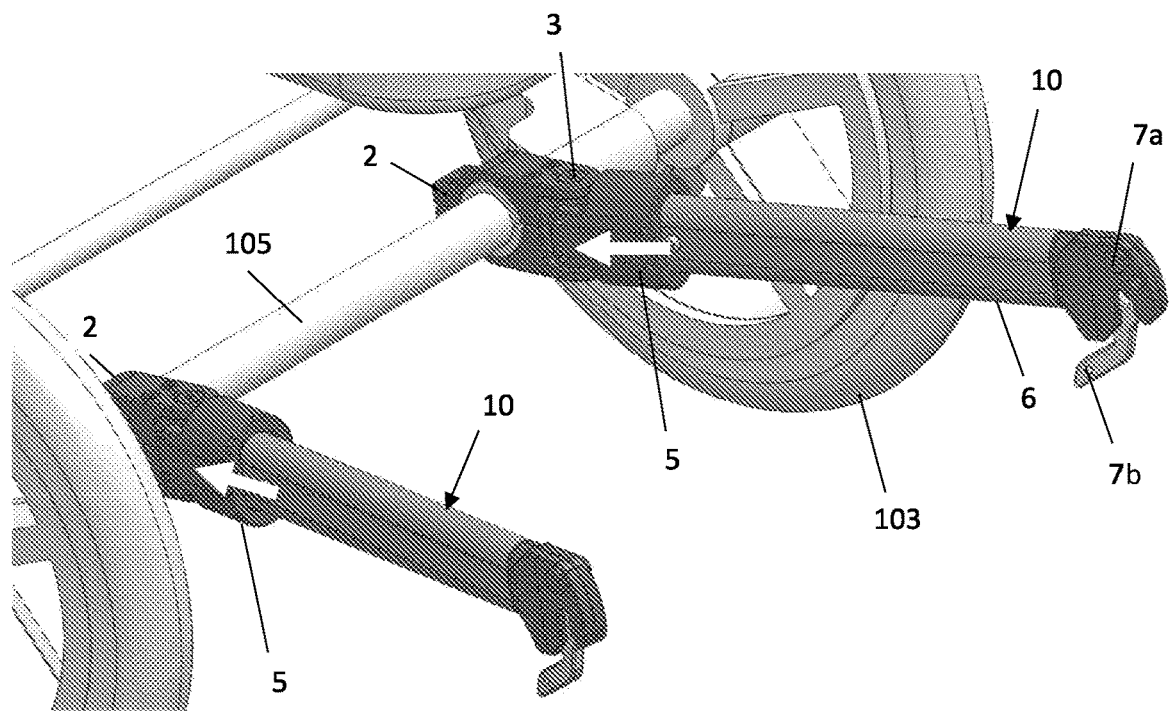

According to an embodiment of the present invention, trigger-latch handle 7b enables an automatic engagement of clamp 7a with adapter 11 by capturing elongated portion 15 within opening 12. For example, clamp 7a and trigger-latch handle 7b can be configured in such a way that the automatic engagement of clamp 7a with adapter 11 is enabled by using a spring loaded latch. On the other way, trigger-latch handle 7b enables to manually disconnect clamp 7a from adapter 11 by enabling to release elongated portion 15 out of opening 12. For example, clamp 7a and trigger-latch handle 7b can be configured in such a way that the unlocking of second clamp 7a is enabled when trigger-latch handle 7b is pressed against the body of clamp 7a, while releasing trigger-latch handle 7b automatically locks clamp 7a. The joint member designed to allow relative movement of the elongated body 6 in at least one degree of freedom (as best seen in FIG. 4B where one possible way of movement of elongated body 6 is indicated by the dotted arrows). Angle locking part 3 designed to limit the movement of turning-folding part 4 upon setting a desired angle or position of elongated body 6 with respect to first clamp 2. As best seen in FIGS. 9A and 9B, sleeve 5 adapted to receive at least a portion of angle locking part 3 in order to lock the foldable arm 10 in an unfolded position (the unfolded position is best seen in FIGS. 4A and 8B), and whenever required, to release angle locking part 3 in order to enable to turn arm 10 into a folded position (the folded position is best seen in FIGS. 7 and 8A). FIG. 1 shows a transparent view of the locking arrangement in which slideable sleeve 5 is located in a default position (i.e., in which foldable arm 10 is locked in an unfolded position). In this default position, slideable sleeve 5 covers almost the entire body of angle locking part 3 and a section of joint member 4 and thereby slideable sleeve 5 prevents the movement of foldable arm 10. FIG. 9A schematically illustrates slideable sleeve 5 when it is slides away from angle locking part 3 and thereby release it, so that when angle locking part 3 is released a relative movement of foldable arm 10 is enabled (e.g., foldable arm 10 can be folded). FIG. 9B schematically illustrates slideable sleeve 5 when it covers angle locking part 3 and accordingly locks foldable arm 10 in an unfolded position.

Connector 100 can be used as a universal device that enables to connect different types of wheeled-carts such as wheelchairs and wheeled-carts such as strollers of various designs. In addition, the universality of connector 100 is also reflected in the ability of adjusting and fitting to different users' heights, as will be described in further details hereinafter.

According to an embodiment of the present invention, connector 100 may further comprise inner-clamp adapters, such as the abovementioned adapter 1 of clamp 2 and such as adapter 9 that is sized and configured to fit the inner section 16 of clamp 14, thus enabling the coupling of foldable arm 10 to different forms and diameters of strollers' frames and to different forms and diameters of wheelchairs' frames, respectively.

The arrangement described in the figures results in a lift mechanism, such upon the engagement of both elements of connector 100, the rear wheels 103 of stroller 101 are being raised above the ground (e.g., about 2-3 cm above the ground level), as indicated by the dotted line 104 in FIG. 3A that schematically represents the ground level. This process (i.e., the lifting) happens due to the novel and unique structure of connector 100 as will be described in further details hereinafter.

FIGS. 4A and 4B schematically illustrate foldable arm 10 attached to stroller 101 while being locked in an unfolded position, according to an embodiment of the present invention. In this embodiment, foldable arm 10 is attached to a bar 105 that is used as an axle to which both rear wheels 103 of stroller 101 are connected (as typically can be found in many types of popular strollers). Foldable arm 10 is attached to bar 105 via clamp 2 (as aforementioned hereinabove, if the inner section 13 of clamp 2 is larger than the width of bar 105, then one may use inner-clamp adapter 1 to better fit clamp 2 to bar 105). The position of foldable arm 10 can be adjusted in an angular manner as indicated by the dotted arrow 106 in FIG. 4A in order to enable the lifting of the rear wheels 103 upon coupling with adapter 11 when it is being mounted on wheelchair 102 (e.g., as indicated in FIGS. 3A, 5A, 5B and 8B). As aforementioned hereinbefore, the relative movement of arm 10, in at least one degree of freedom, is indicated by the dotted arrows 106a in FIG. 4B.

An additional advantage provided by the present invention is the ability to fold the stroller without needing to disconnect the foldable arm 10 from the stroller, but only turning the foldable arm into a folded position as best seen in FIG. 7, where each unit of foldable arm 10 in its folded position is parallel to bar 105 on which rear wheels 103 of stroller 101 are mounted.

Figure 6:
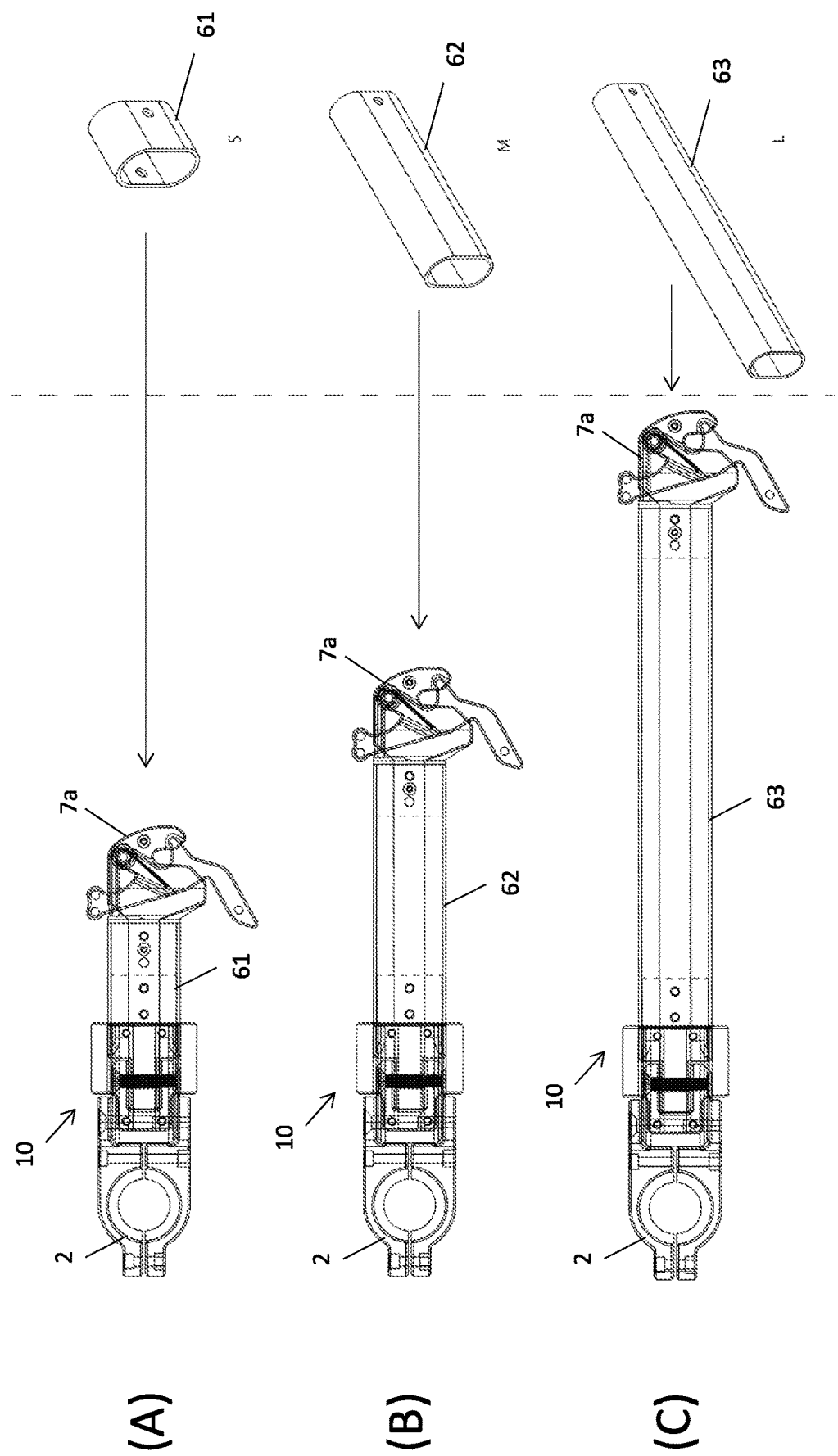
FIG. 6 schematically illustrates means for adjusting the length of the foldable arm, according to an embodiment of the invention.
Figure 10A:
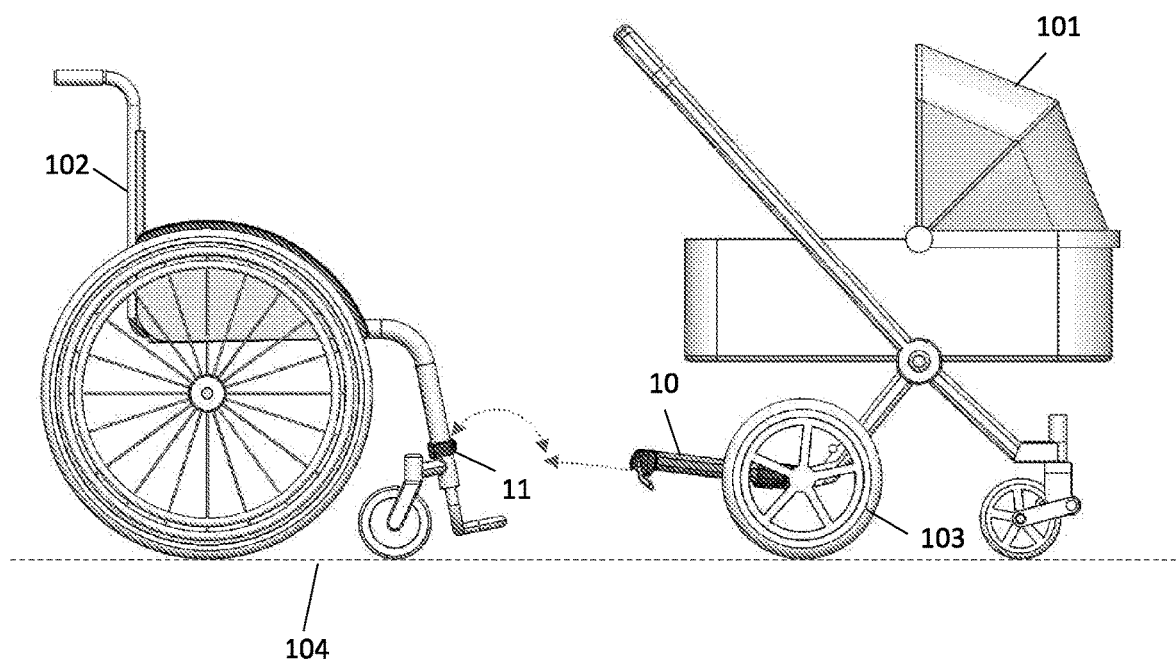
FIGS. 10A-10C schematically illustrate the process of coupling a wheelchair to a stroller in a lifting manner by using the connector of FIG. 1.
Figures 10B, 10C:
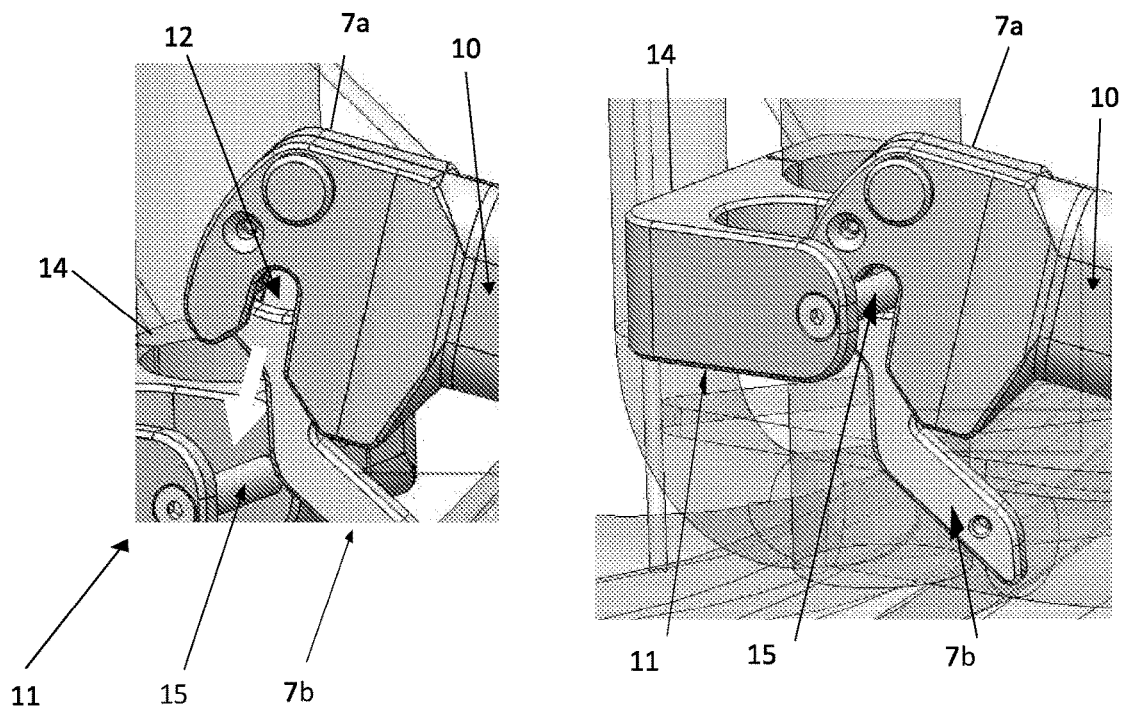

According to an embodiment of the present invention, the length of foldable arm 10 can be adjusted by replacing elongated body 6 with a longer or shorter member as schematically illustrated in FIG. 6 and indicated by numerals 61, 62 or 63. As will be appreciated by a person skilled in the art, other forms of length adjusting means can also be used such as telescopic means, where the elongated body 6, the body of clamp 2 or the body of clamp 7a may include telescopic arrangements (not shown). FIGS. 10A-10C schematically illustrate the process of coupling a wheelchair to a stroller in a lifting manner by using connector 100. In FIG. 10A, foldable arm 10 is coupled to stroller 101 and is being set in the unfolded position. At this stage, a user needs to pull and lift stroller 101 in order to engage clamp 7a of foldable arm 10 with adapter 11, as indicated by the dotted arrows. FIG. 10B schematically illustrates a detailed view of a stage prior to the engagement of foldable arm 10 with adapter 11, according to an embodiment of the present invention. This stage shows the placement of clamp 7a on the corresponding section of adapter 11 that is configured to enable the engagement with clamp 7a (e.g., in this embodiment the corresponding section is elongated portion 15 of adapter 11). Upon placement of clamp 7a on elongated portion 15, trigger-latch handle 7b automatically lock elongated portion 15 within opening 12. FIG. 10C schematically illustrates the engagement of foldable arm 10 with adapter 11, in which elongated portion 15 is locked within opening 12 that is formed by clamp 7a and trigger-latch handle 7b. As a result of this process foldable arm 10 and adapter 11 become releasably connected in a manner that partially lifts the rear wheels 103 of stroller 102 above the ground level (as shown in FIG. 3A) to enable better steering. In order to disconnect wheelchair 102 from stroller 101 one needs to operate trigger-latch handle 7b in order open clamp 7a so that elongated portion 15 can be released.

Figure 11:
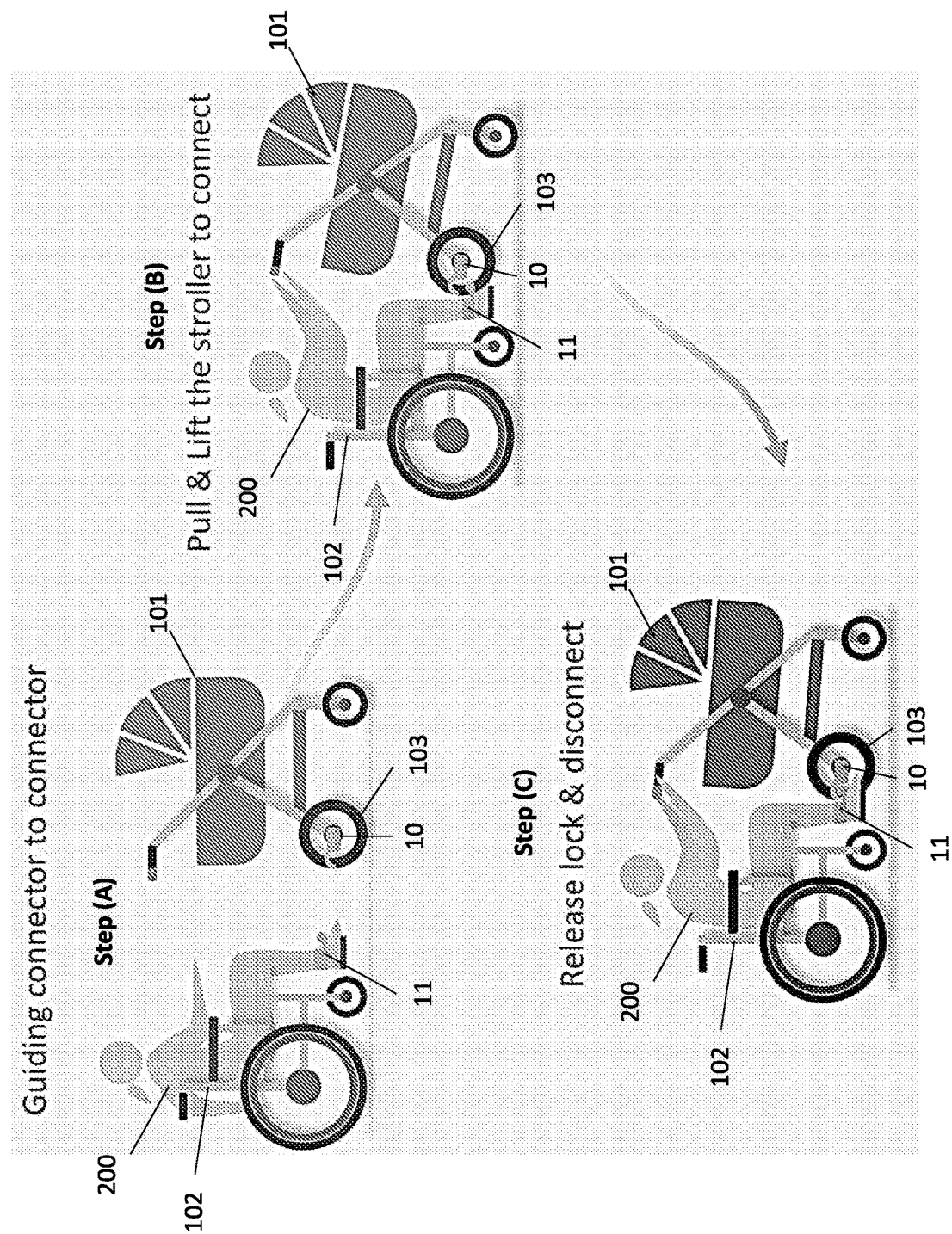
FIG. 11 schematically illustrates the process of coupling a wheelchair to a stroller in a lifting manner by a wheelchair occupant, according to an embodiment of the invention.

FIG. 11 refers to another example that demonstrates in three steps (A, B and C) the process of coupling wheelchair 102 to stroller 101 in a lifting manner by a wheelchair occupant 200, according to an embodiment of the present invention. In step (A) the occupant 200 of wheelchair 102 needs to face the rear side of stroller 102. In step (B) occupant 200 of wheelchair 102 needs to pull and lift stroller 102 in order to automatically connect foldable arm 10 with adapter 11. The connector of the present invention enables a wheelchair occupant to readily attach and detach a stroller from the wheelchair while remaining seated in the wheelchair.

Figure 12A:
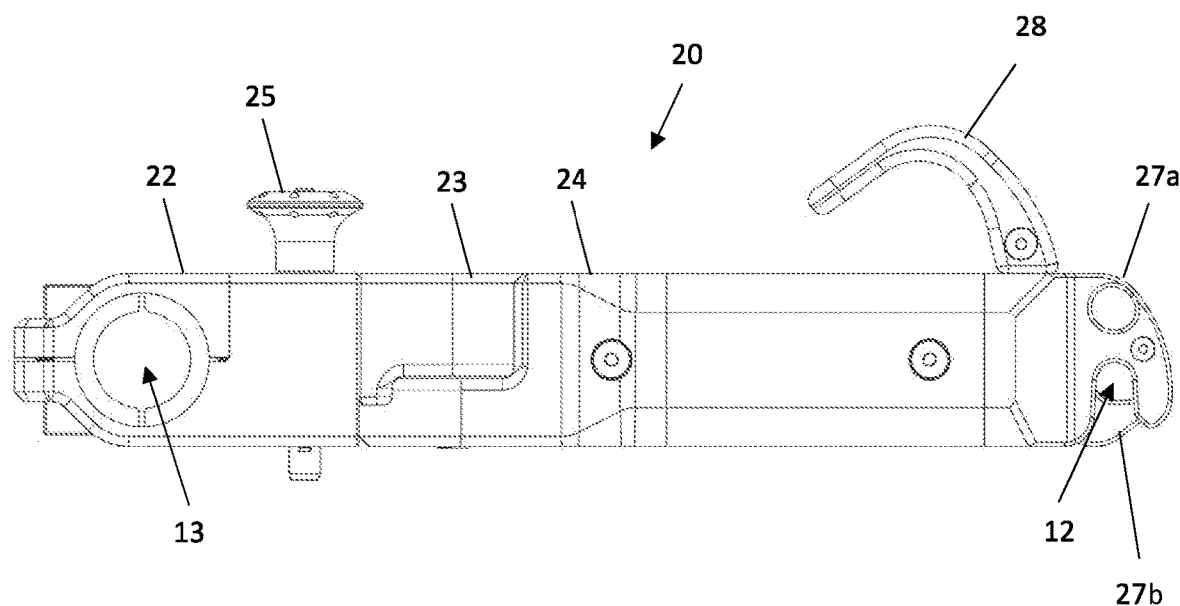
FIGS. 12A and 12B schematically illustrate a side view of a foldable and detachable arm of a connector for releasably attaching a wheelchair to a stroller, according to an embodiment of the invention.
Figure 12B:
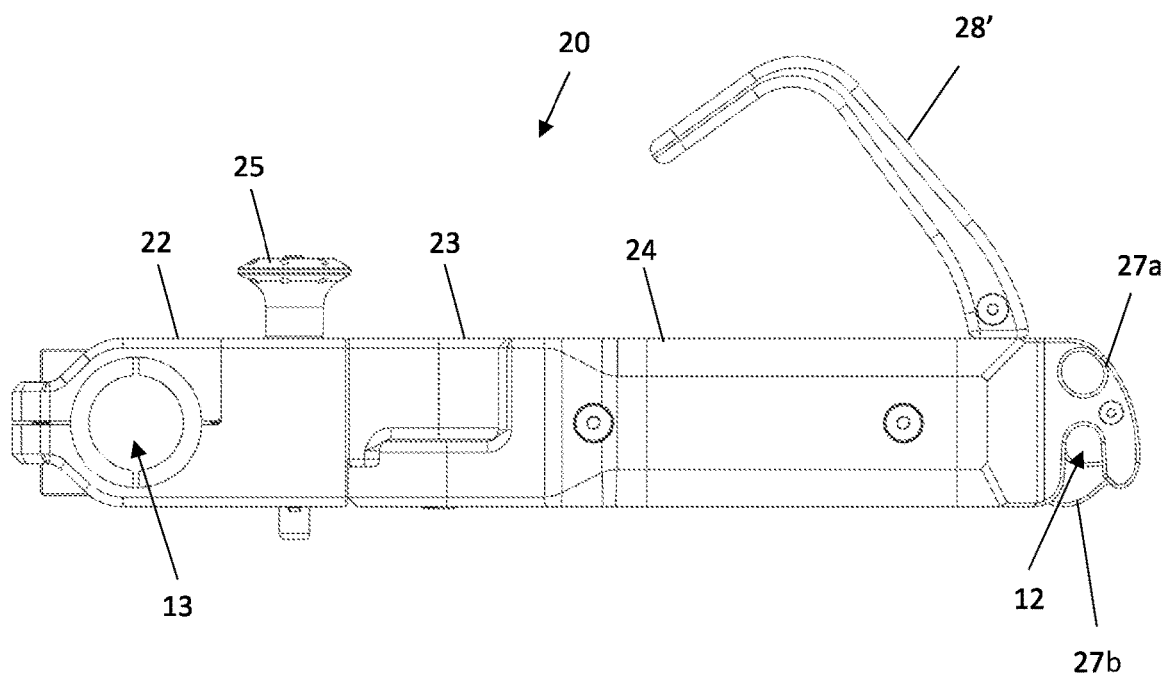
Figure 12C:
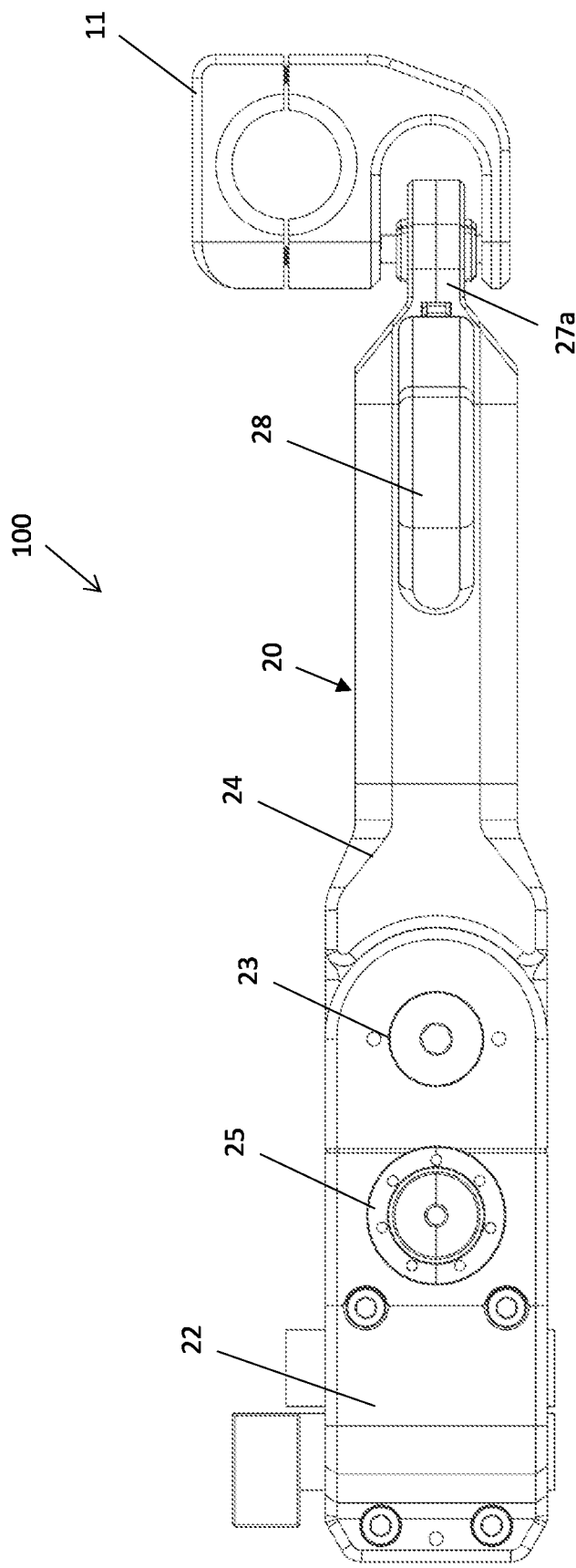
FIG. 12C schematically illustrates a top view of the arm of FIG. 12A engaged with an adapter that is adapted to be coupled to a wheelchair.

FIG. 12A schematically illustrates a side view of a foldable and detachable arm 20 of connector 100 for releasably attaching a wheelchair to a stroller, according to an embodiment of the present invention. Arm 20 comprises a first clamp 22, a pin 25, a locking arrangement that includes a turning-folding detachable part 24 that is pivotally connected to an angle locking adjustable cog wheel mechanism 23 that forms together a joint member that enables to lock arm 20 in an unfolded position, and a second clamp 27a and its latch 27b that enables locking/unlocking of second clamp 27a (thereby enabling to releasably attach one wheeled-cart to another). Arm 20 may further comprise an optional lift handle 28 that enables automatically releasing latch 27b. Handle 28 can be provided in variety of sizes and shapes in order to enable accessibility and grasp with minimum bending forwards, for example, when the user wants to quickly disconnect the wheelchair from the stroller. For example, FIG. 12B schematically illustrates arm 20 provided with a lift handle 28' that is longer than lift handle 28 of FIG. 12A. In other embodiments, lift handle 28 is provided with an adjustable length. FIG. 12C schematically illustrates a top view of arm 20 engaged with adapter 11 (that is adapted to be coupled to a wheelchair).

Figure 12D:
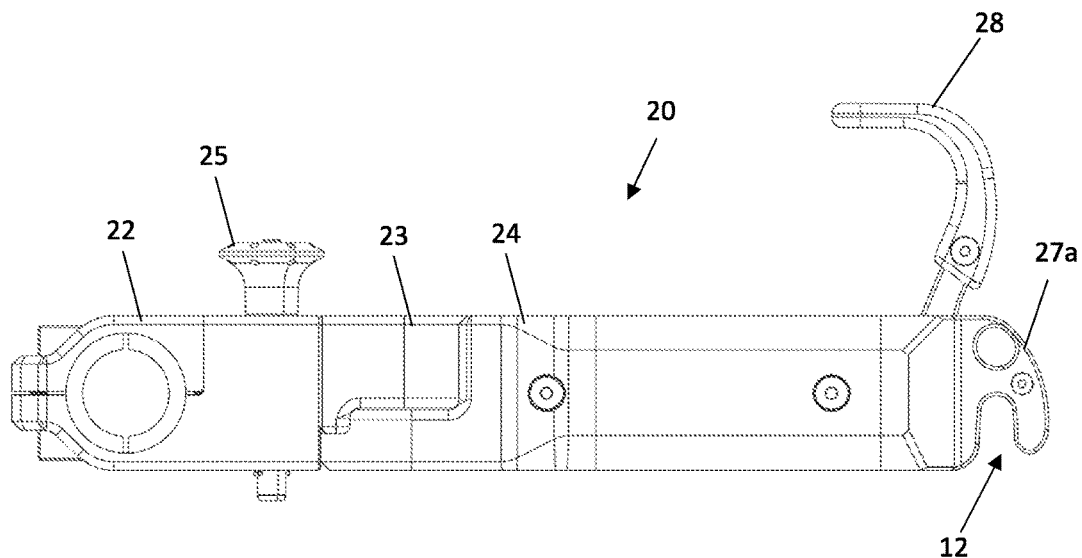
FIG. 12D schematically illustrates a side view of the arm of FIG. 12A provided with a handle in an opened position, according to an embodiment of the invention.
Figure 12E:
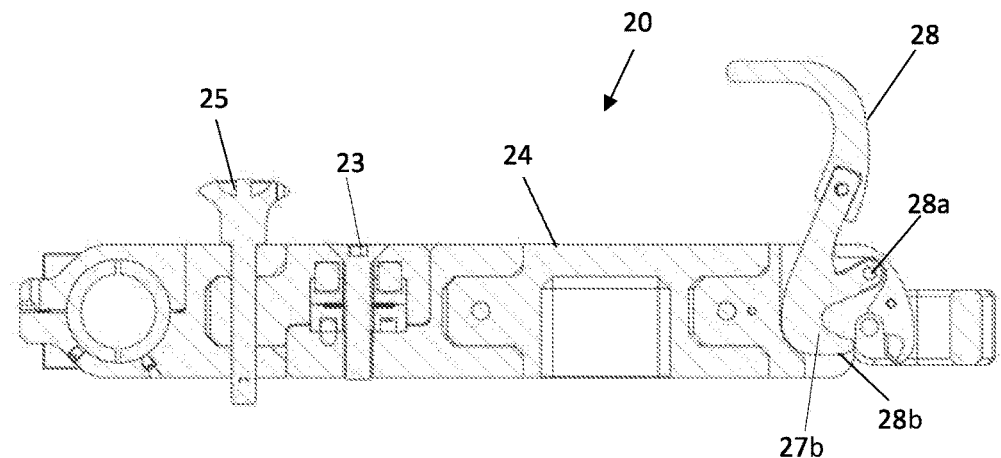
FIG. 12E schematically illustrates a cross-sectional view of the arm of FIG. 12A provided with the handle in an opened position.
Figure 12F:
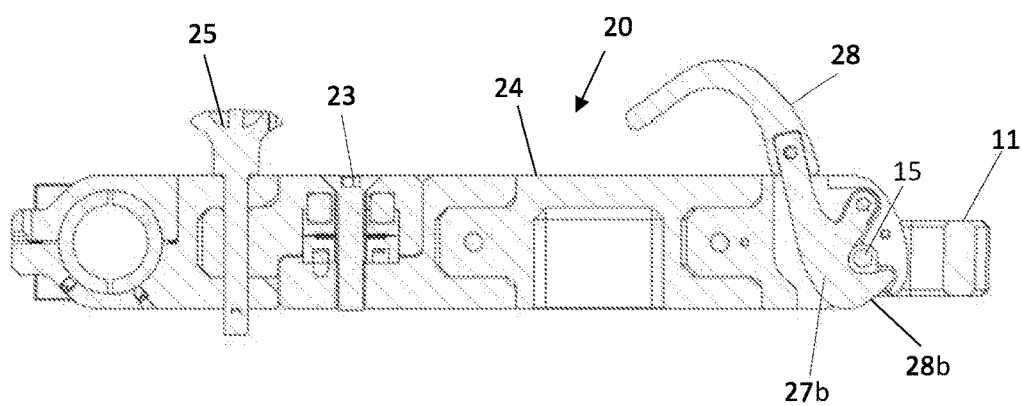
FIG. 12F schematically illustrates a cross-sectional view of the arm of FIG. 12A provided with the handle in a closed position.

Handle 28 enables a quick single action releasing latch 27b by lifting handle 28 and consequently the stroller. This can be done by easily pulling up handle 28 (even with only one hand). While pulling up handle 28, it can further be used as a lever to lift arm 20 and consequently the stroller. FIG. 12D schematically illustrates handle 28 in an opened position, according to an embodiment of the present invention. FIG. 12E schematically illustrates a cross-section view of arm 20 provided with handle 28 in an opened position and FIG. 12F schematically illustrates a cross-section view of arm 20 provided with handle 28 in a closed position. According to another embodiment of the present invention, the rotation hinge 28a of handle 28 (shown in FIGS. 12E and 12F) is a spring loaded hinge forcing handle 28 to a normally-closed state. It can easily understood by a person of the art that when a vertical force is applied on the curved surface 28b (i.e., the load of lifted stroller when arm 20 is lowered by the user onto elongated portion 15 of adapter 11) it will be pushed aside, forcing handle 28 to open until elongated portion 15 is fully inserted into opening 12, where spring loaded hinge 28a will force handle 28 back to its closed position. It would be readily noted by a person skilled in the art that the geometric shape and position of latch 27b (shown in FIG. 12A) would lock latch 27b, thus preventing an undesirable release of elongated portion 15. The described arrangement allows a single action engagement of stroller 101 to wheel chair 102 by lifting stroller 101 with unfolded arms 20 and lowering it down while second clamps 27a are on top of elongated portion 15. Obviously, the capability of engaging or disengaging arm 20 to the second wheeled-cart in one action using a single hand provides a significant advantage to people which are capable of operating only one hand.

Figure 12G:
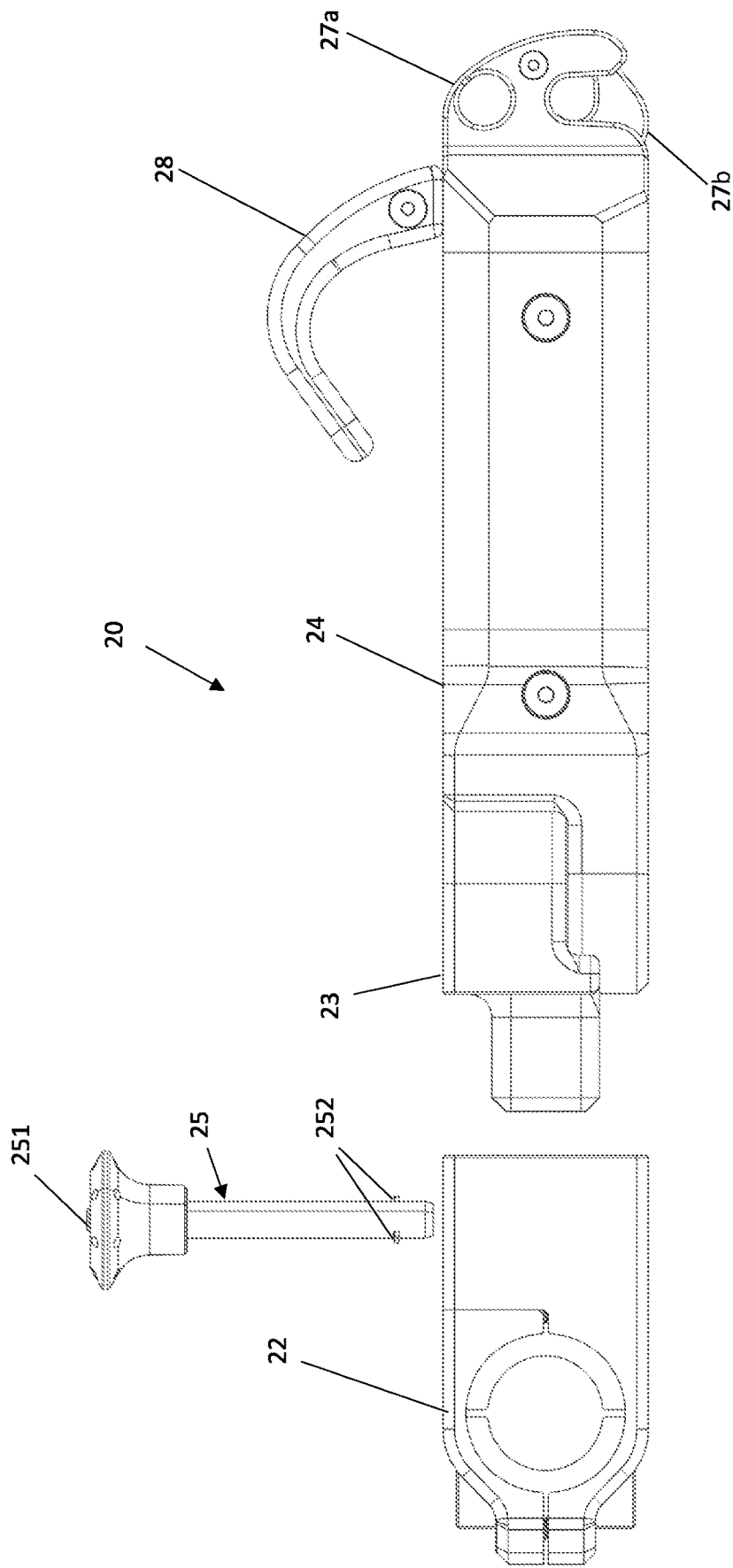
FIG. 12G schematically illustrates a side view of the arm of FIG. 12A in a detached mode, according to an embodiment of the invention.

FIG. 12G schematically illustrates a side view of arm 20 in a detached mode, according to an embodiment of the present invention. In this mode, mechanism 23 (to which part 24 is pivotally connected) is disconnected from clamp 22. The detachment is enabled by extracting pin 25. For example, pin 25 may comprise locking teeth 252 that are need to be pressed inward the body of pin 25 in order to enable the release of pin 25. In this example, teeth 252 are pressed inward by applying pressure on teeth releasing element 251 which is located at the top portion of pin 25. Teeth releasing element 251 is mechanically connected with teeth 252, thus while applying pressure on element 251 it causes teeth 252 to be pressed inward. When pressure is not applied on element 251, teeth 252 are normally extend out of the body of pin 25, thus forming an anchoring or locking arrangement that prevents the extraction of pin 25.

Figure 12H:
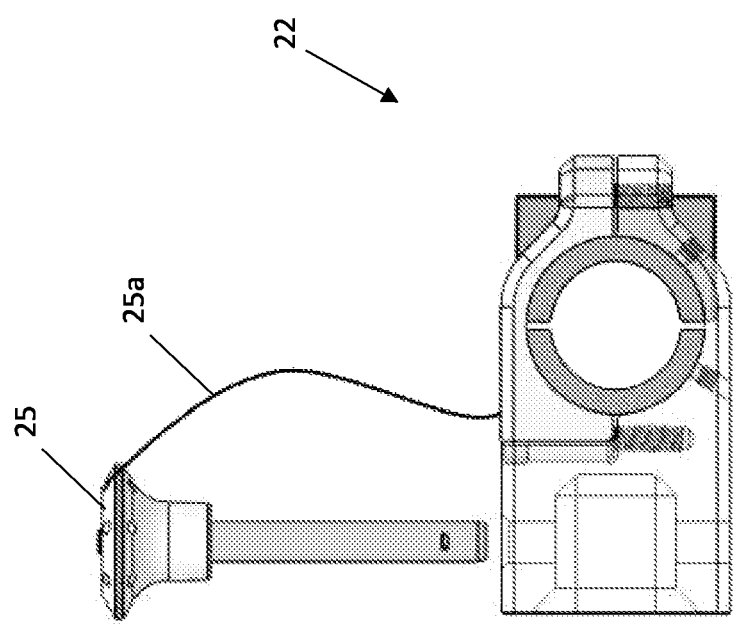
FIG. 12H schematically illustrates a side view of the clamp 22 of FIG. 12 with pin securement wire, according to an embodiment of the invention.

FIG. 12H schematically shows a side view of clamp 22, according to an embodiment of the present invention, in which pin 25 is provided with a securement metal wire 25a, where one end of wire 25a is secured to pin 25 and the opposite end is secured to clamp 22, thus preventing the possible loss of pin 25 when it is not engaged into clamp 22. The present invention is not limited to the specific embodiment of FIG. 12H and the best suitable securement measure for pin 25 can be selected by a skilled person from the broad range of pin securement measures of various designs and materials proposed by the art.

The permanent lifting of the rear wheels of stroller 101 after coupling arm 20 to wheel chair 102 (i.e., as best shown in FIG. 3A) requires additional measures for preventing the swivel of bar 105 within clamp 22.

Figure 13A:
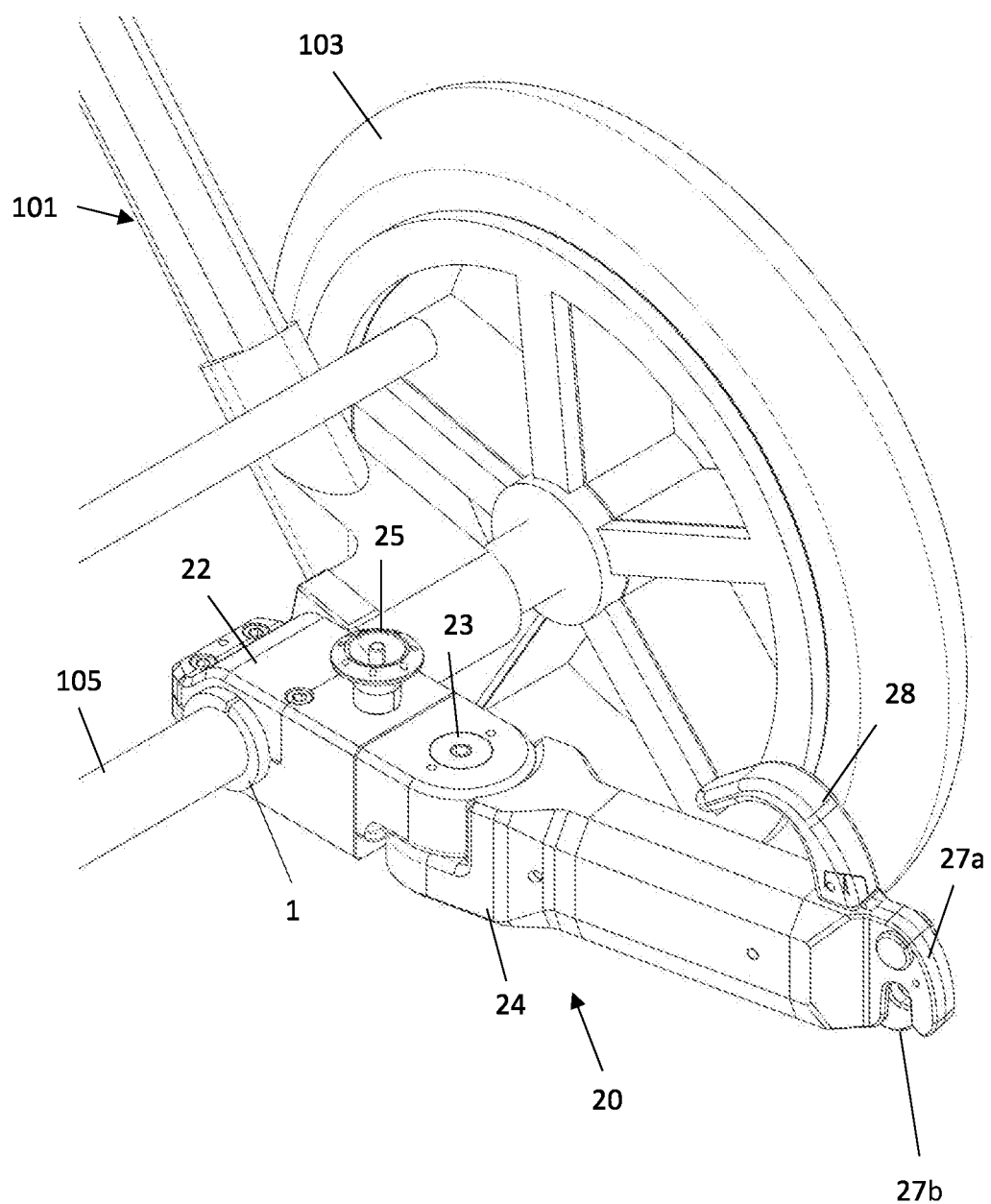
FIG. 13A schematically illustrates a perspective view of arm of FIG. 12A attached to a stroller's rear wheels axle, according to an embodiment of the invention.

FIG. 13A schematically illustrates a perspective view of arm 20 attached to bar 105 (that is used as an axle to which both rear wheels 103 of stroller 101 are connected), according to an embodiment of the present invention. Arm 10 is attached to bar 105 via clamp 22.

FIGS. 13B-13D illustrate the utilization of anti-swivel measures in conjunction or in lieu of adapter 1 and/or clamp 22, according to embodiments of the present invention.

FIG. 13B shows fixation screws 131 which are embedded in clamp 22a, according to an embodiment of the present invention, in which screws 131 are threaded into clamp 22a, thus stabbing adapter 1a which is firmly clamping bar 105, hence bar 105 cannot swivel with respect to adapter 1a, and adapter 1a cannot swivel with respect to clamp 22a, hence the swivel of bar 105 with respect to arm 20 is prevented.

FIG. 13C shows an alternative grooved adapter 1b (best shown in FIG. 13E) adapted into internally jagged clamp 22b, FIG. 13D show an enlarged detail view, in which tooth 132a of clamp 22b are engaged into grooves 132b of adapter 1b, thus preventing a rotation of adapter 1b inside clamp 22b, hence since adapter 1b is clamped onto bar 105 the relative swivel of bar 105 within arm 20 is not possible.

Some embodiments of the present invention utilize a foldable or extractable protruding member which is provided as one part or as an add-on attachment with clamp 22a, adapter 1, or with similar embodiments of adapter 1 (i.e., such as adapter 1a or 1b) which when unfolded or extracted it interacts with a fixed structural member of stroller 101 for preventing the swivel of the stroller's rear axle.

Figure 13F:
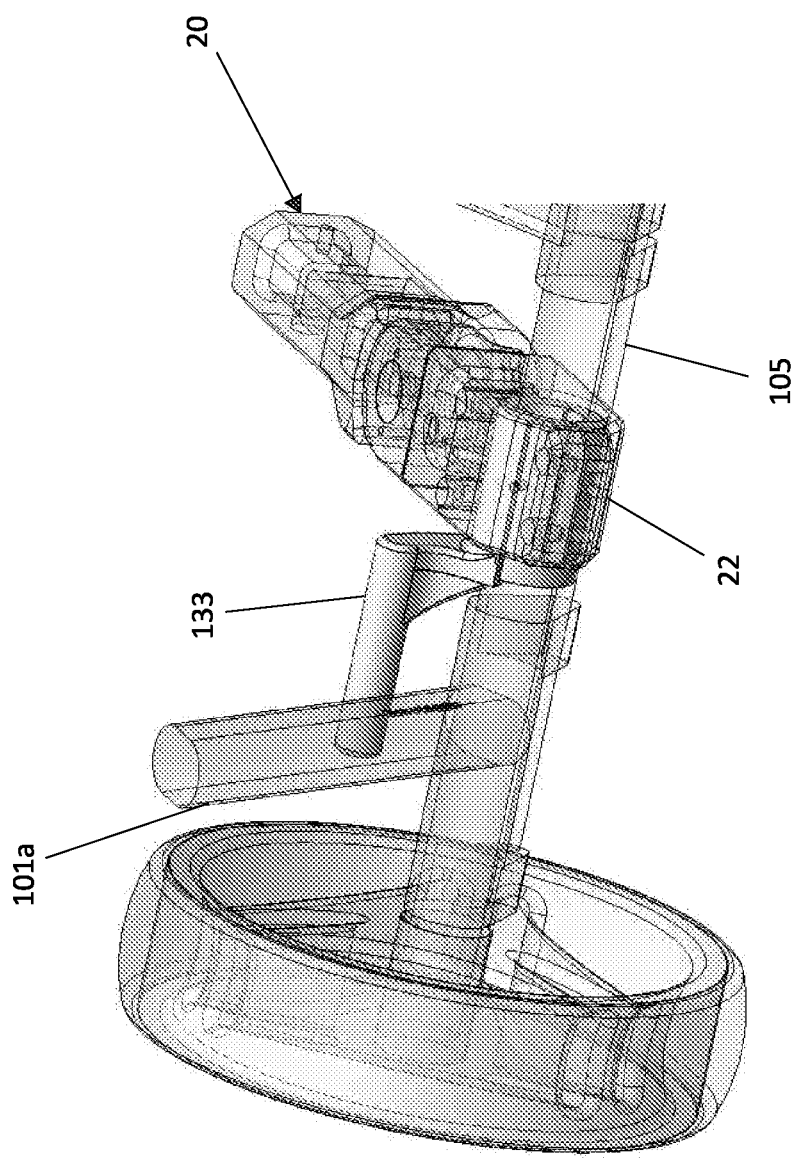

FIG. 13F illustrates a protruding element, according to an embodiment of the present invention, in which protruding element 133 is interfacing with a fixed structural member 101a of stroller 101 in such a manner that the swivel of bar 105 is limited.

Of course, many different designs of similar swivel limiting arrangement can be provided for limiting the swivel in one or in both directions, with a single or with more than one protruding elements, which can suitably selected by the skilled person in the art.

Some strollers may be provided without bar 105, i.e., with independent rear wheels which are not interconnected.

Figure 13H:
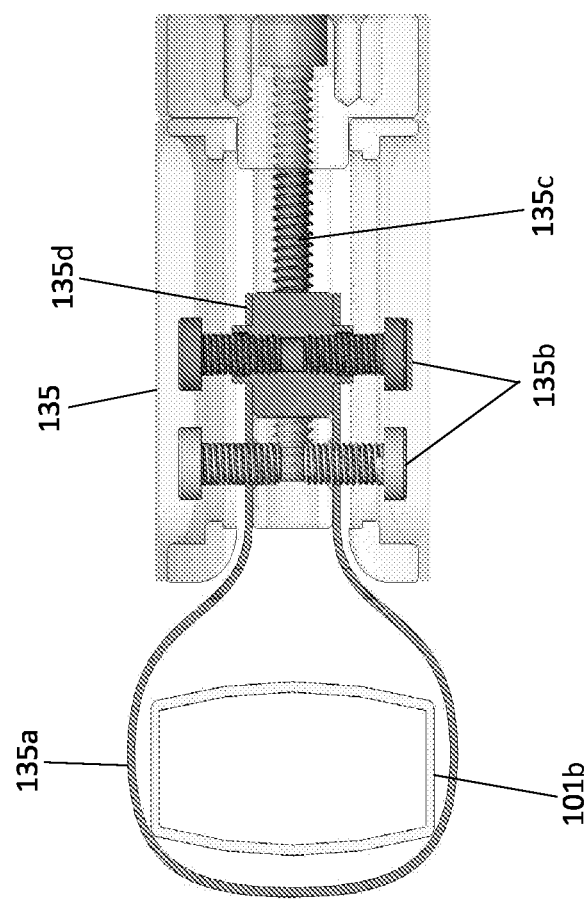
FIGS. 13G-13H an alternative coupling of arm 20 to stroller 101, according to an embodiment of the present invention.
Figure 13G:
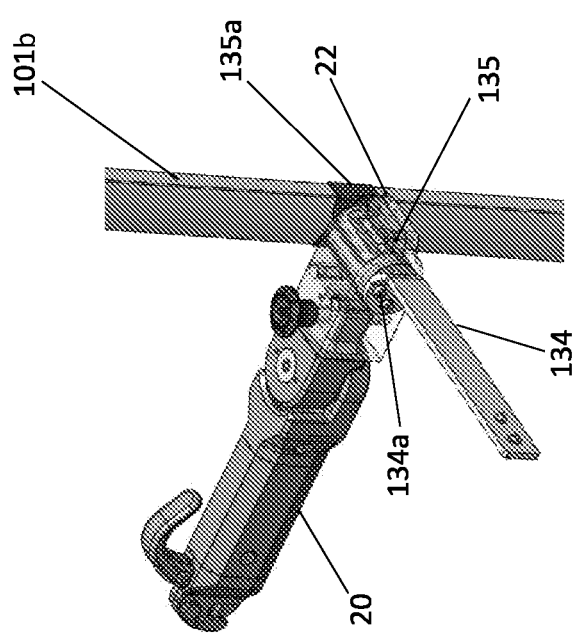

FIGS. 13G-13H schematically shows an alternative coupling of arm 20 to stroller 101, according to an embodiment of the present invention, in which auxiliary bar 134 is coupled to a substantially vertical structural element 101b of stroller 101 through coupling members which comprise a clam-bar adapter 135 (i.e., onto clamp 22 is attached where a stroller is not provided with bar 105), a retention strap (e.g., metal band) 135a, bolts 135b and retention bolt 135c, wherein bar 134 is fastened onto adapter 135 using bolts 135b and adapter 135 is coupled with structural element 101b by retention strap 135a. Retention strap 135a is attached into adapter 135 with bolts 135b, and can be released or firmed on element 101b by threading retention bolt 135c. As can be appreciated by a person skilled in the art, alternative elements can be used for providing a suitable coupling arrangement of bar 134 and for adapting it for the clamping of arm 20 to stroller 101. For example, a double action of pulling retention strap 135a by a center slider 135d while tightening the retention strap 135a around the form of structural element 101b is achieved by the threading of retention bolt 135c within center slider 135d.

Figure 14A:
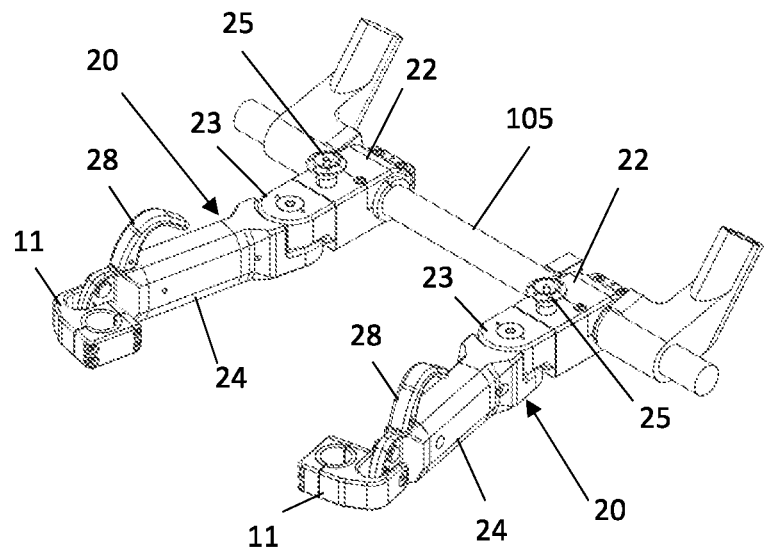
FIGS. 14A and 14B schematically illustrate foldable and detachable arm of FIG. 12A in an attached mode and detached mode, respectively, according to an embodiment of the invention.
Figure 14B:
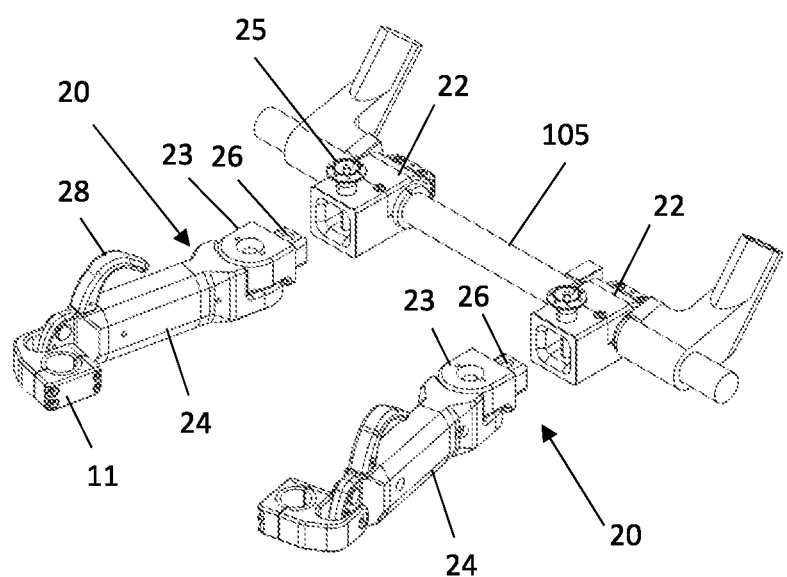

FIGS. 14A and 14B schematically illustrate foldable and detachable arm 20 in an attached mode and detached mode, respectively. In FIG. 14A turning-folding detachable part 24 that is pivotally connected to angle locking adjustable cog wheel mechanism 23 are attached to clamp 22. In FIG. 14B turning-folding detachable part 24 that is pivotally connected to angle locking adjustable cog wheel mechanism 23 are detached from clamp 22. The detachment is enabled by releasing pin 25 out of a corresponding hole 26 that is located at the body of cog wheel mechanism 23 (i.e., by extracting pin 25 out of hole 26). In the detach mode, clamp 22 may remain engaged to bar 105 of the stroller.

Figure 15A:
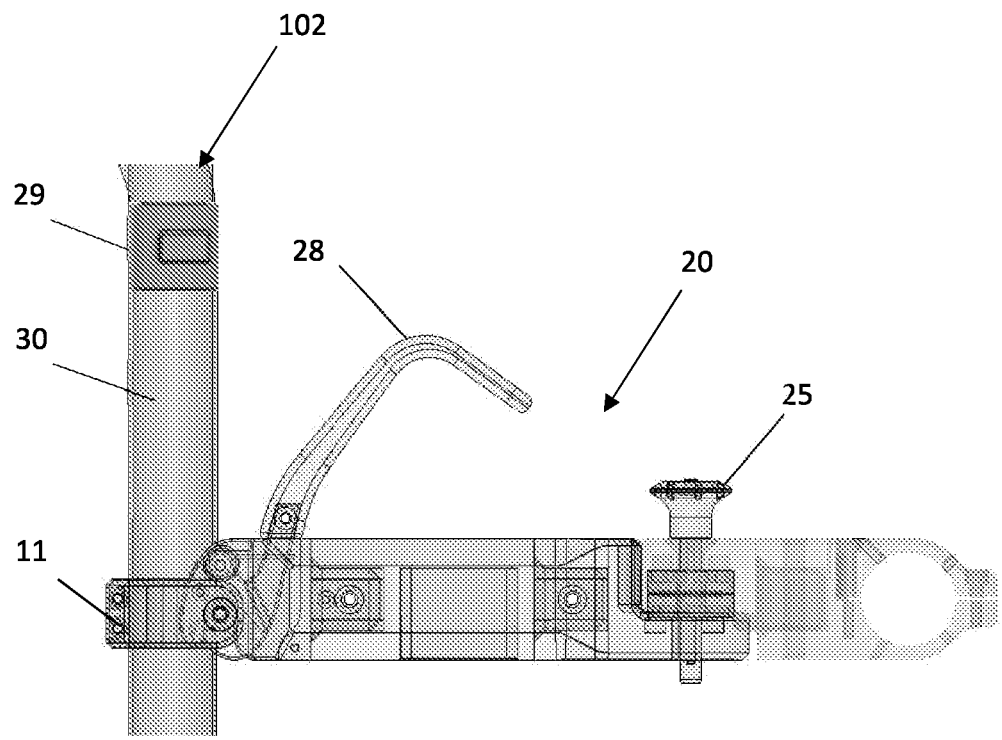
FIGS. 15A and 15B schematically illustrate the arm of FIG. 12A engaged with a corresponding adapter that is mounted on a wheelchair, wherein the wheelchair is further provided with a magnet adapted for holding the handle of the arm in an open position, according to an embodiment of the invention.
Figure 15B:
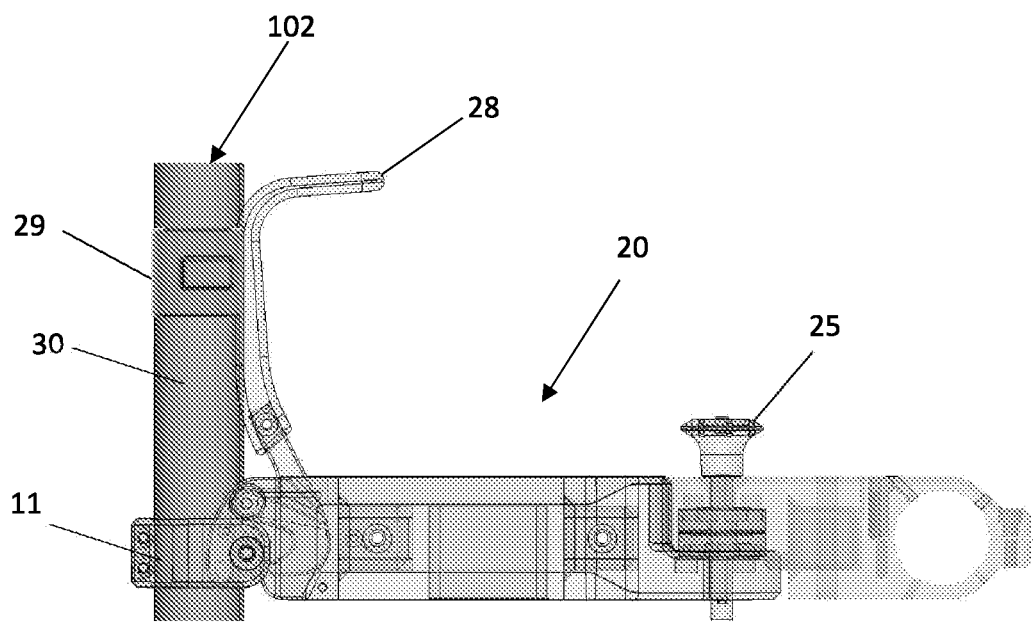

FIGS. 15A and 15B show additional accessibility feature according to an embodiment of the present invention, in which handle 28 could be held in an opened position to enable releasing each arm 20 separately for single handed operation. For example, handle 28 can be held in an open position by a magnet 29 or other snap mechanism attached to wheel chair 102 (e.g., handle 28 can be made of metal or may comprise a metal layer and magnet 29 can be attached to a frame portion 30 of wheel chair 102 in a location that is suitable to hold handle 28 when is located in an open position, as schematically illustrated in FIGS. 15A and 15B). Further shown in FIGS. 15A and 15B is a quick release pin 25 which is part of the folding adjustment mechanism (i.e., mechanism 23 of FIG. 14A).

Figure 16:
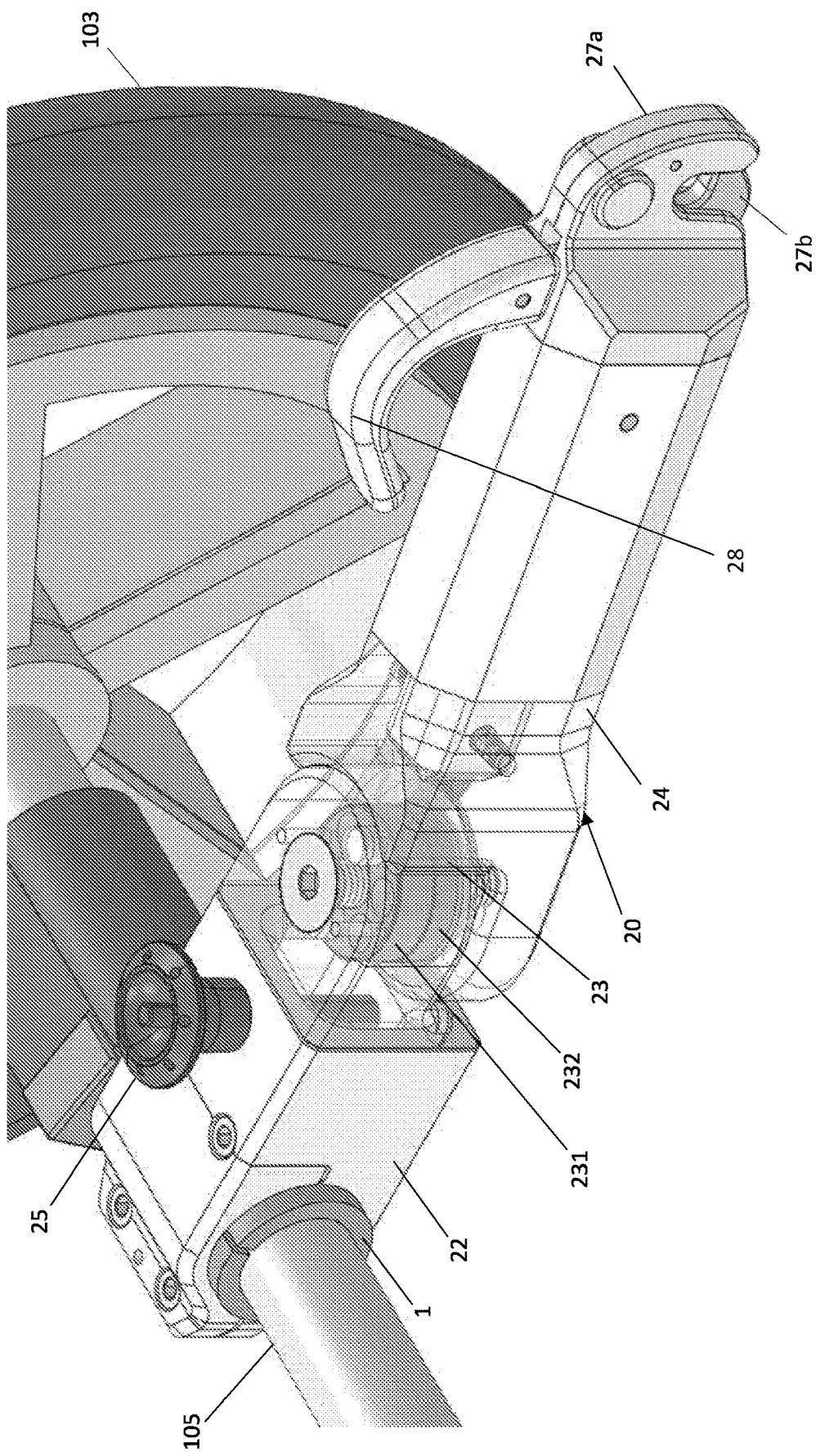
FIG. 16 schematically illustrates a perspective and partially transparent view of the arm of FIG. 12A, according to an embodiment of the invention.

FIG. 16 schematically illustrates a perspective and partially transparent view of arm 20, according to an embodiment of the present invention. In this figure, angle locking adjustable cog wheel mechanism 23 is shown. Cog wheel mechanism 23 enables to fine tune the angle of arm 20 in order to optimally connect a specific wheelchair to a specific type of stroller by using connector 100 (i.e., via arm 20 and adapter 11). In this embodiment, cog wheel mechanism 23 comprises a first rotating part 231 having plurality of cogs, which adapted to mesh with another toothed part 232 in order to set the angle of arm 20 (i.e., of part 24). The size and the number of tooth of parts 231 and 232 may define the steps between the current position/angle to the following one.

Figure 17C:
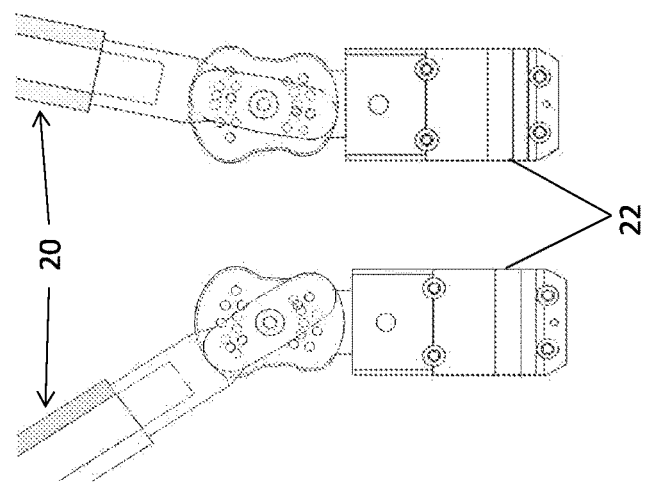
FIGS. 17-21 schematically illustrate angle adjustment and locking arrangements, according to different embodiments of the present invention.
Figure 17B:
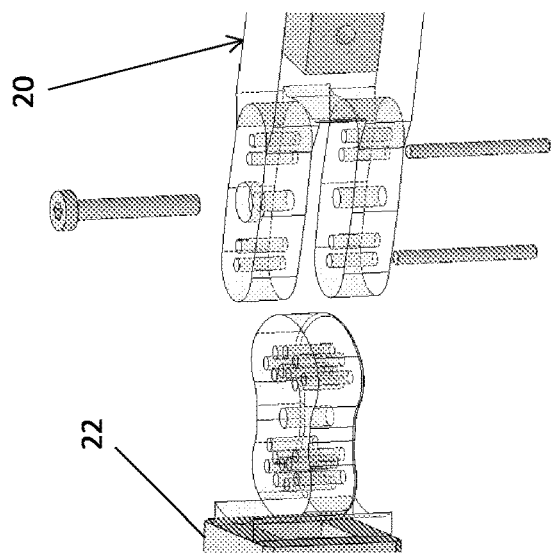
Figure 17A:
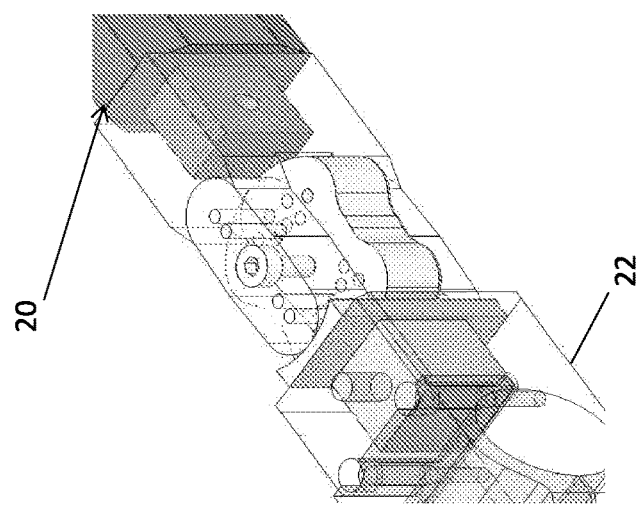
Figure 18B:
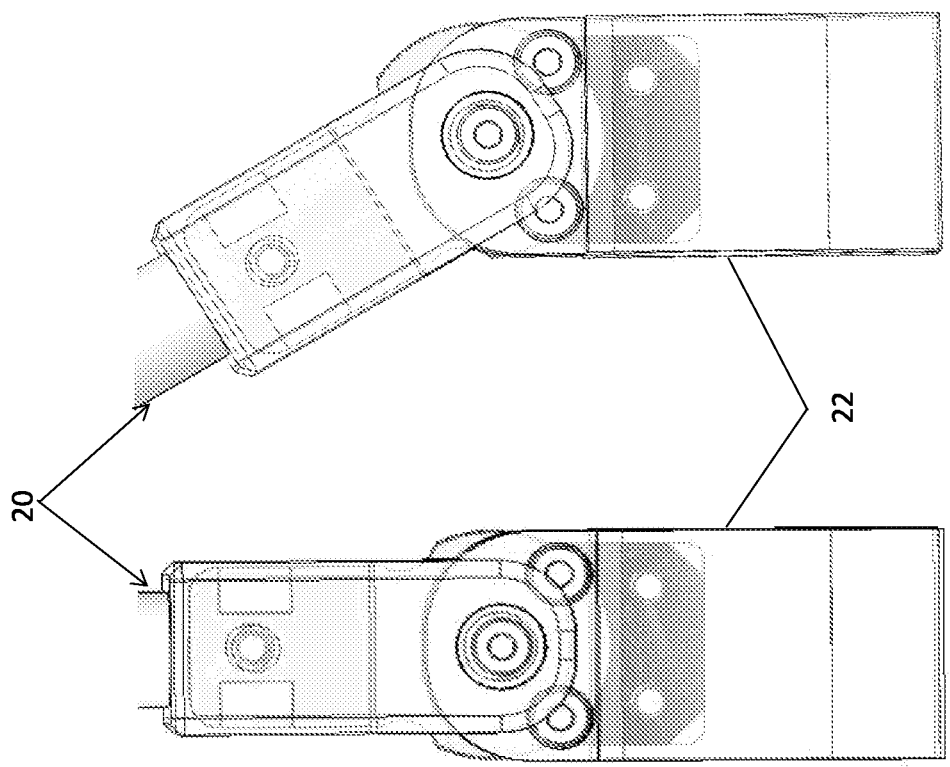
Figure 18A:
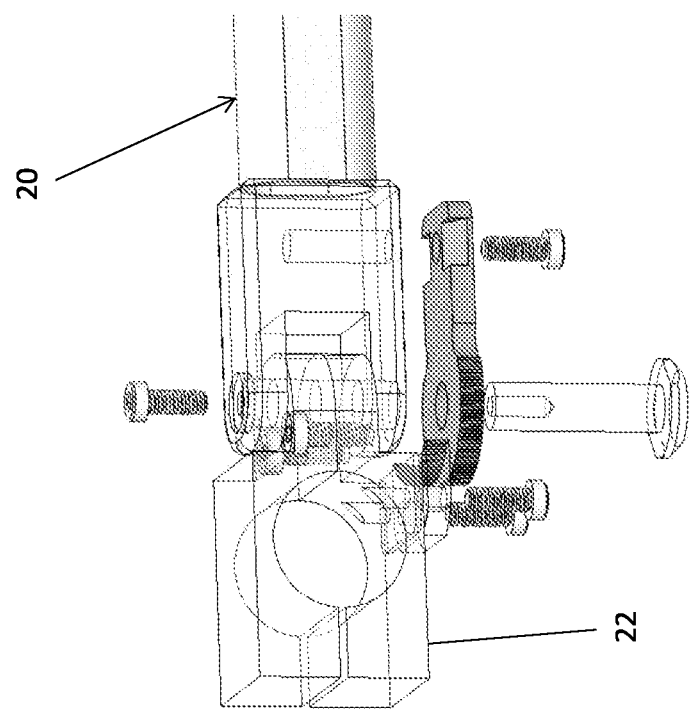

A broad variety of folding and angle adjustment and locking arrangements can be utilized in embodiments of the present invention of three main categories:

Two states arrangements (i.e., folded or unfolded) such as the slideable sleeve 5 of FIGS. 1, 9A and 9B;

Angular steps adjustment arrangements, such as the cog wheel mechanism 23 of FIGS. 12A, 14A, 14B and 16 and additional arrangements such as latching pins arrangement (i.e., corresponding preset holes in the proximal extremities of arm 20 and clamp 22 are coupled with locking pins to accomplish the desirable folding angle as shown in FIGS. 17A and 17B) and jagged base plate arrangement (i.e., jagged base plate is connected to arm 20, a desirable angle is selected as allowed by the cogs pitch followed by fastening the base plate onto clamp 22—as shown in FIGS. 18A-18C).

Figure 19B:
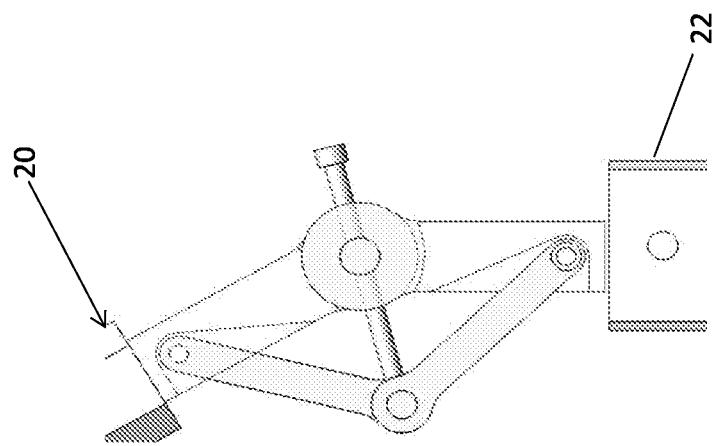
Figure 19A:
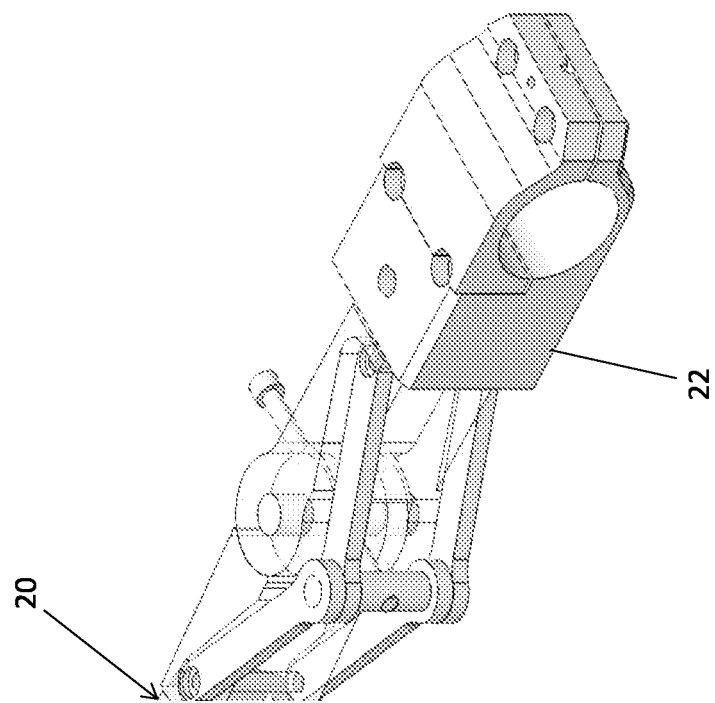
Figure 20:
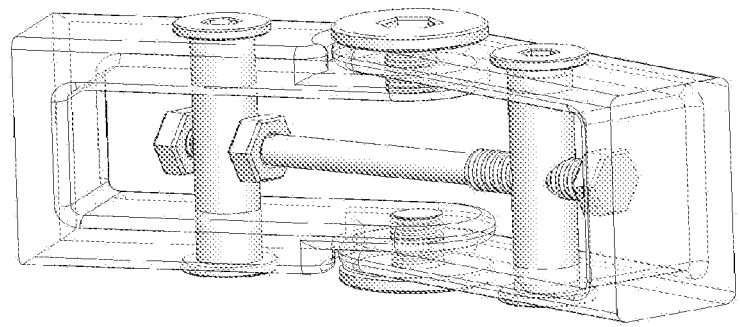
Figure 21:
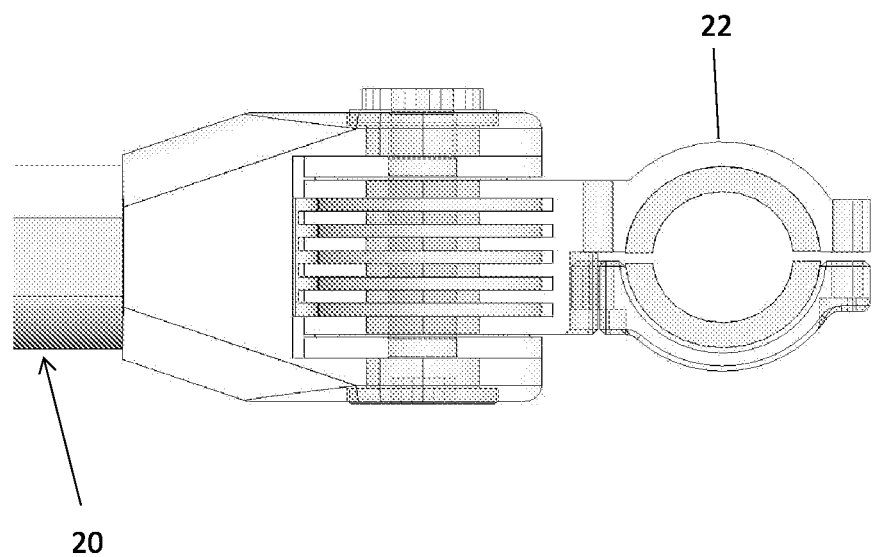

Continuous angular adjustment arrangements, such as a jackscrew mechanism (shown in FIGS. 19A and 19B), a joining leadscrew mechanism (shown in FIG. 20) or a Clutch plates arrangement (shown in FIG. 21)

Connect & Release actions of the stroller and the wheelchair using connector 100 of the present invention can be achieved in several ways. For example:

To connect the stroller to the wheelchair—the user may lift the stroller handle and position clamp 7a of arm 10 (or clamp 27a of arm 20) on elongated portion 15 of adapter 11;

To disconnect the stroller from the wheelchair using arm 10—the user may press trigger-latch handle 7a towards arm 10 & than lift one arm at a time;

To disconnect the stroller from the wheelchair using arm 20—the user may open each handle 28, one at a time, keeping each handle 28 in an open position by magnetic fastener or snap on wheelchair (e.g., as described hereinabove with respect to magnet 29 in FIGS. 15A and 15B).

Further quick disconnection option of the stroller from arm 20 and the wheelchair is pulling pin 25, thus leaving clamps 22 attached to the stroller.

All the above description and examples have been given for the purpose of illustration and are not intended to limit the present invention in any way. Many different coupling and engagement mechanisms can be employed, all without exceeding the scope of the present invention.

The invention claimed is:

1. A connector for releasably attaching a first wheeled-cart to a wheelchair, comprising:
   a) an elongated body that forms an arm;
   b) a first clamp connected to one end of the arm via a joint member, wherein said joint member enables relative movement of said arm in at least one degree of freedom;
   c) a locking arrangement for locking said arm in a folded or in an unfolded position; and
   d) a second clamp connected to the other end of said arm, wherein the first clamp is adapted to be coupled to the first wheeled-cart and the second clamp is adapted to be releasably attached to the wheelchair when said arm is locked in an unfolded position,
   wherein attaching the first wheeled-cart to the wheelchair results in lifted rear wheels of the first wheeled-cart to facilitate the steering of the first wheeled-cart by the wheelchair user.

2. The connector according to claim 1, in which the second clamp is releasably attached to the wheelchair via an adapter mounted thereon.

3. The connector according to claim 2, in which the adapter comprises attachment means for mounting the adapter on a desired location on the wheelchair while a portion of said adapter is adapted to enable the second clamp to be releasably attached to said adapter.

4. The connector according to claim 2, in which the second clamp comprises a spring loaded hinge mechanism for enabling an automatic secured engagement with the corresponding adapter of the wheelchair.

5. The connector according to claim 2, in which the second clamp comprises a lifting handle, which allows the one-hand lifting of said connector together with the first wheeled-cart and to be engaged or disengaged with the corresponding adapter of the wheelchair—in a single action.

6. The connector according to claim 1, in which the length of the elongated body is adjustable.

7. The connector according to claim 1, further comprising a telescopic arrangement for adjusting the length of the elongated body.

8. The connector according to claim 1, in which the first wheeled-cart is a stroller.

9. The connector according to claim 1, provided with a quick-release locking pin mechanism for enabling a single action disengagement of the first wheeled cart from the arm which remain connected to the wheelchair.

10. The connector according to claim 9, in which the locking pin is provided with a securement measure, utilized to avoid undesired loss of said pin when it is not pulled out.

11. The connector according to claim 1, in which the locking arrangement for locking said arm in a folded or in an unfolded position is a slideable sleeve arrangement.

12. The connector according to claim 1, in which the arm folding is adjustable in angular steps, by a folding mechanical arrangement.

13. The connector according to claim 12, in which the folding mechanical arrangement comprises a cog wheels mechanism, latching pins, jagged base plate arrangements, or a combination thereof.

14. The connector according to claim 1, in which the arm folding angle is continuously adjustable, by a folding mechanical arrangement.

15. The connector according to claim 14, in which the folding mechanical arrangement comprises a joining leadscrew, clutch plates mechanisms, or a combination thereof.

16. The connector according to claim 1, in which the first clamp is designed to connect to a substantially horizontal structural member of the first wheeled-cart and orthogonal to its intended travel direction of.

17. The connector according to claim 15, in which the structural member is a rear axle of the first wheeled-cart.

18. The connector according to claim 17, provided with at least one anti-swivel measure for preventing the swivel of the rear axle inside the first clamp.

19. The connector according to claim 16, in which the substantially horizontal structural member of the first wheeled-cart is substantially horizontal relative to ground.

* * * * *